(12) United States Patent
Sato et al.

(10) Patent No.: US 9,824,586 B2
(45) Date of Patent: Nov. 21, 2017

(54) MOVING OBJECT RECOGNITION SYSTEMS, MOVING OBJECT RECOGNITION PROGRAMS, AND MOVING OBJECT RECOGNITION METHODS

(71) Applicants: DENSO IT LABORATORY, INC., Tokyo (JP); DENSO CORPORATION, Kariya, Aichi (JP)

(72) Inventors: Ikuro Sato, Tokyo (JP); Yukimasa Tamatsu, Aichi (JP); Kunihiro Goto, Aichi (JP)

(73) Assignees: DENSO IT LABORATORY, INC., Tokyo (JP); DENSO CORPORATION, Kariya, Aichi (JP)

( * ) Notice: Subject to any disclaimer, the term of this patent is extended or adjusted under 35 U.S.C. 154(b) by 334 days.

(21) Appl. No.: 13/689,196

(22) Filed: Nov. 29, 2012

(65) Prior Publication Data

US 2014/0037138 A1    Feb. 6, 2014

(30) Foreign Application Priority Data

Jul. 31, 2012    (JP) .................................. 2012-169709

(51) Int. Cl.
  *G08G 1/16*    (2006.01)
  *G06K 9/00*    (2006.01)

(52) U.S. Cl.
  CPC ......... *G08G 1/166* (2013.01); *G06K 9/00805* (2013.01)

(58) Field of Classification Search
  CPC ........................... G06K 9/00805; G08G 1/166
  See application file for complete search history.

(56) References Cited

U.S. PATENT DOCUMENTS 4,143,370 A *   3/1979   Yamanaka ............ G01S 13/931
                                                  342/107
5,534,870 A *   7/1996   Avignon ............... G01S 13/931
                                                  342/107
(Continued)

FOREIGN PATENT DOCUMENTS

EP    2 578 464 A1    4/2013
JP    H11-3499 A      1/1999
(Continued)

OTHER PUBLICATIONS

Machine translation of Japanese office action for Application No. 2012-169709 dated Jun. 23, 2015.*
(Continued)

*Primary Examiner* — Katrina Fujita
(74) *Attorney, Agent, or Firm* — Pearne & Gordon LLP

(57) ABSTRACT

The moving object recognition system includes: a camera that is installed in a vehicle and captures continuous single-view images; a moving object detecting unit that detects a moving object from the images captured by the camera; a relative approach angle estimating unit that estimates the relative approach angle of the moving object detected by the moving object detecting unit with respect to the camera; a collision risk calculating unit that calculates the risk of the moving object colliding with the vehicle, based on the relationship between the relative approach angle and the moving object direction from the camera toward the moving object; and a reporting unit that reports a danger to the driver of the vehicle in accordance with the risk calculated by the collision risk calculating unit.

20 Claims, 18 Drawing Sheets

(56) References Cited

U.S. PATENT DOCUMENTS

| | | | |
|---|---|---|---|
| 5,926,117 A | 7/1999 | Gunji et al. | |
| 6,256,584 B1* | 7/2001 | Kodaka | B60T 7/22 180/167 |
| 6,338,022 B1* | 1/2002 | Shinmura | B62D 15/0265 701/301 |
| 6,571,176 B1* | 5/2003 | Shinmura | B60T 7/22 180/421 |
| 7,924,215 B2* | 4/2011 | Nakanishi | G01S 13/931 342/107 |
| 7,957,858 B1* | 6/2011 | Larson | G05D 1/0206 340/435 |
| 8,184,857 B2 | 5/2012 | Akita | |
| 8,244,458 B1* | 8/2012 | Blackburn | 701/301 |
| 2003/0236602 A1 | 12/2003 | Kuge et al. | |
| 2006/0008120 A1 | 1/2006 | Ohkubo | |
| 2007/0285217 A1 | 12/2007 | Ishikawa et al. | |
| 2008/0243389 A1* | 10/2008 | Inoue et al. | 701/301 |
| 2009/0189814 A1* | 7/2009 | Moriuchi | G01S 3/48 342/451 |
| 2010/0027844 A1* | 2/2010 | Akita | 382/103 |
| 2010/0030474 A1* | 2/2010 | Sawada | G08G 1/163 701/301 |
| 2011/0019873 A1 | 1/2011 | Yamato | |
| 2011/0128138 A1 | 6/2011 | Yamamoto et al. | |
| 2011/0153268 A1* | 6/2011 | Jordan | G01S 13/931 702/151 |
| 2011/0210872 A1 | 9/2011 | Molander | |
| 2012/0133769 A1 | 5/2012 | Nagamine et al. | |
| 2012/0262284 A1* | 10/2012 | Irrgang | B60W 30/0956 340/435 |
| 2013/0169425 A1* | 7/2013 | Victor | B60Q 1/525 340/435 |
| 2013/0286205 A1* | 10/2013 | Okada | H04N 7/18 348/148 |
| 2014/0028451 A1* | 1/2014 | Takahashi | G08G 1/168 340/463 |
| 2014/0136015 A1* | 5/2014 | Hayakawa | B60T 7/22 701/1 |
| 2014/0225723 A1* | 8/2014 | Sobue | B60R 1/00 340/435 |
| 2014/0232538 A1* | 8/2014 | Sobue | B60R 1/00 340/435 |

FOREIGN PATENT DOCUMENTS

| | | |
|---|---|---|
| JP | 2004-17930 A | 1/2004 |
| JP | 2005-82124 A | 3/2005 |
| JP | 2011-081613 A | 4/2011 |
| JP | 2011-118482 A | 6/2011 |
| JP | 4919036 B2 | 4/2012 |

OTHER PUBLICATIONS

Sato et al., "Crossing Obstacle Detection with a Vehicle-Mounted Camera", Jun. 2011, Intelligent Vehicles Symposium (IV), 2011 IEEE, 60-65.*

Andreas Wedel et al. "Realtime Depth Estimation and Obstacle Detection from Monocular Video", 28th DAGM Symposium, p. 475-484 (2006).

Extended European Search Report for Application No. 12194786.5 dated Oct. 20, 2014.

Japanese Office action for Application No. 2012-169709 dated Jun. 23, 2015.

Supplemental European Search Report for Application No. 15175825.7 dated Nov. 30, 2015.

* cited by examiner (a)　　　　　　　　　　　　　(b)

Fig.18

| LEVEL PRIOR TO CORRECTION | TTC LEVEL | LEVEL AFTER CORRECTION |
|---|---|---|
| 1 | 1 | 1 |
| 1 | 2 | 2 |
| 1 | 3 | 3 |
| 2 | 1 | 4 |
| 2 | 2 | 5 |
| 2 | 3 | 6 |
| 3 | 1 | 7 |
| 3 | 2 | 8 |
| 3 | 3 | 9 |

MOVING OBJECT RECOGNITION SYSTEMS, MOVING OBJECT RECOGNITION PROGRAMS, AND MOVING OBJECT RECOGNITION METHODS

CROSS REFERENCE TO RELATED APPLICATION

The disclosure of Japanese Patent Application No. 2012-169709, filed on Jul. 31, 2012, is incorporated herein by reference.

BACKGROUND OF THE INVENTION

Field of the Invention

The present invention relates to moving object recognition systems, moving object recognition programs, and moving object recognition methods for recognizing moving objects by using single-view images.

Description of the Related Art

There have been known moving object recognition systems that recognize moving objects existing near a vehicle, and then report to or alert the driver or automatically perform braking on the vehicle (hereinafter referred to simply as "reporting"). The distance from the vehicle to a moving object can be directly measured by using a distance sensor such as a millimeter-wave radar, or can be measured by performing image processing with a stereo camera. The moving direction of the moving object and the velocity of the moving object relative to the vehicle can be determined by arranging measured distances in chronological order and then analyzing those distances. As the moving direction of the moving object and the velocity of the moving object relative to the vehicle are determined, the probability (risk) of the moving object colliding with the vehicle can be calculated, and reporting can be performed in accordance with the risk.

As simpler and less expensive moving object recognition systems, there also have been systems that recognize a moving body with a monocular camera that has only one line of an optical system and an imaging element. Such a system continuously captures images with a monocular camera, to obtain single-view images arranged in chronological order. The technique disclosed in U.S. Pat. No. 8,184,857 which is incorporated herein by reference is known as a technique for detecting a moving object from such single-view images.

By the technique disclosed in U.S. Pat. No. 8,184,857, feature points are extracted from each of single-view images arranged in chronological order, and the feature points are grouped by moving objects, based on the motion vectors (optical flows) of the extracted feature points. The grouping is performed based on variations in the convergence properties of the optical flows to a vanishing point and the external ratios. In this manner, accurate moving object detection can be performed, even if there is an inaccurately-calculated optical flow.

In an in-vehicle moving object recognition system, it is preferable to report only the risk of a moving object colliding with or rushing toward the vehicle to the driver, without reporting any moving object with no risk of collision to the driver. This is because reporting every moving object bothers the driver, and might adversely affect the driving.

In such an in-vehicle moving object recognition system, the reliability of a result of recognition processing does not always match an actual risk of collision. That is, the risk of collision might be zero, though the result of recognition processing shows a high level of reliability, and vice versa. Information that is useful to most drivers is not the information about the reliability of recognition processing but the information about the risk of a recognized moving object colliding with his/her own vehicle.

SUMMARY OF THE INVENTION

The present invention has been made in view of the above problems, and the object thereof is to provide a moving object recognition system that senses a danger of collision of a moving object by using a monocular camera, instead of a relatively expensive sensor such as a stereo camera or a distance sensor.

According to an aspect of the present invention, a moving object recognition system includes: a camera configured to capture a plurality of continuous single-view images, the camera being installed in a vehicle; a moving object detecting unit configured to detect a moving object from the images captured by the camera; a relative approach angle estimating unit configured to estimate a relative approach angle of the moving object detected by the moving object detecting unit with respect to the camera; and a collision risk calculating unit configured to calculate a risk of the moving object colliding with the vehicle, based on a relationship between the relative approach angle and a moving object direction from the camera toward the moving object.

With this structure, the risk of a moving object colliding with the vehicle can be obtained as information useful for the driver of the vehicle to drive safely. Also, the risk calculation is performed with a relatively inexpensive mechanism such as a monocular camera, instead of a relatively expensive mechanism such as a stereo camera. Accordingly, the costs can be lowered.

In the moving object recognition system, the collision risk calculating unit may make the risk higher as the difference between the relative approach angle and the moving object direction becomes smaller.

When the relative approach angle matches the moving object direction, the moving object is heading toward the vehicle in a relative manner. In view of this, the risk becomes higher, as the difference between the relative approach angle and the moving object direction becomes smaller. Accordingly, the risk of a moving object colliding with the vehicle can be accurately calculated by the above structure.

In the moving object recognition system, the collision risk calculating unit may set a danger zone based on the relative approach angle, and calculate the risk based on a probability of the moving object existing in the danger zone.

With this structure, the risk of a moving object colliding with the vehicle can be accurately calculated by using not only the relative approach angle of the moving object with respect to the vehicle, but also the danger zone that is set based on the relative approach angle.

In the moving object recognition system, the danger zone may be set in an X-Z plane where the camera is the point of origin, an optical axis direction of the camera is a Z direction, a vertical direction is a Y direction, and a horizontal direction is an X direction, and may be a region extending from the vehicle in a direction at the relative approach angle and having a width of the vehicle.

With this structure, the danger zone is designed to have a width equivalent to the width of the vehicle and extend from the vehicle in the direction at the relative approach angle. Accordingly, the risk of collision with any portion of the vehicle can be calculated.

In the moving object recognition system, the collision risk calculating unit may include: a distance estimating unit configured to estimate an upper limit value of a distance from the camera to the moving object in the Z direction; and a risk calculating unit configured to calculate the risk by determining a proportion of a line segment existing in the danger zone to a line segment of an XZ ray between the camera and the upper limit value, the XZ ray being a line segment formed by orthographically projecting a straight line onto the X-Z plane, the straight line passing through the camera and the moving object in the images located at a focal distance from the camera.

With this structure, an upper limit is set on the danger zone. Accordingly, even if the distance to a moving object cannot be determined, the probability of the moving object existing in the danger zone can be calculated by identifying the moving object direction.

In the moving object recognition system, the moving object detecting unit may include: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and the distance estimating unit may select a lowest feature point having the lowest height among the grouped feature points existing on the moving object, and estimate the upper limit value of the distance from the camera to the moving object in the Z direction by calculating a Z-coordinate of a ground surface point that is an intersection point between a straight line connecting the lowest feature point to the optical center and a ground surface on which the vehicle is running.

The assumption that the distances between feature points grouped as a moving object are sufficiently smaller than the distance from the camera is valid in a moving object recognition system that recognizes moving objects existing near the vehicle. Accordingly, the upper limit of the distance to a moving object can be accurately estimated by a simple calculation in this structure.

In the moving object recognition system, the collision risk calculating unit may include: a distance estimating unit configured to estimate a distance from the camera to the moving object in the Z direction; and a risk calculating unit configured to make the risk higher when a point at the estimated distance from the camera on an XZ ray exists in the danger zone than when the point does not exist in the danger zone, the XZ ray being a line segment formed by orthographically projecting a straight line onto the X-Z plane, the straight line passing through the camera and the moving object in the images located at a focal distance from the camera.

With this structure, the distance to a moving object is estimated. Accordingly, it is possible to determine whether the moving object exists in the danger zone, instead of the probability of the moving object existing in the danger zone. If the moving object is determined to be in the danger zone, the risk is calculated to be high. The risk may be divided into a few levels in accordance with portions of the vehicle with which the moving object collides.

In the moving object recognition system, the moving object detecting unit may include: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and the distance estimating unit may calculate, based on the vanishing point, a time to collision of the moving object with the vehicle, and estimate, based on the time to collision and a velocity of the vehicle, the distance from the camera to the moving object in the Z direction.

A moving object that is dangerous to a running vehicle is a moving object that moves in a direction perpendicular to the traveling direction of the vehicle (for example, a moving object that goes by the vehicle is not so dangerous). The assumption that a moving object is translationally moving in a direction perpendicular to the vehicle (or the velocity component of the moving object in the direction of the optical axis of the camera is zero) is valid in a moving object recognition system that recognizes moving objects existing near the vehicle. Accordingly, the distance to a moving object can be accurately estimated by a simple calculation in this structure.

In the moving object recognition system, the collision risk calculating unit may include: a distance estimating unit configured to determine a probability distribution of a distance from the camera to the moving object in the Z direction; and a risk calculating unit configured to calculate the risk, based on a value of the integral of a probability density function of the probability distribution within a distance range in which an XZ ray exists in the danger zone, the XZ ray being a line segment formed by orthographically projecting a straight line onto the X-Z plane, the straight line passing through the camera and the moving object in the images located at a focal distance from the camera.

With this structure, a distance is estimated not in the form of a single value, but in the form of a probability distribution. Accordingly, the risk can be accurately calculated in accordance with the proportion of the value of the integral of the probability density function of the probability distribution in the danger zone.

In the moving object recognition system, the moving object detecting unit may include: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and the distance estimating unit may calculate, based on the vanishing point, a time to collision of the moving object with the vehicle, and determine, based on the time to collision, the probability distribution of the distance in compliance with a predetermined normal distribution.

The assumption that a distance probability distribution is a normal distribution is valid in a moving object recognition system that recognizes moving objects existing near the vehicle. Accordingly, the probability distribution of the distance to a moving object can be accurately determined by a simple calculation in this structure.

In the moving object recognition system, the collision risk calculating unit may include: a distance estimating unit configured to estimate an upper limit value of a distance from the camera to the moving object in the Z direction, and determine a probability distribution of the distance from the camera to the moving object in the Z direction; and a risk calculating unit configured to calculate the risk, based on a proportion of a value of the integral of a probability density function of the probability distribution within a distance range in which an XZ ray exists in the danger zone to a value of the integral of a probability density function of the probability distribution within a distance range up to the upper limit value, the XZ ray being a line segment formed by orthographically projecting a straight line onto the X-Z plane, the straight line passing through the camera and the moving object in the images located at a focal distance from the camera.

With this structure, a distance is estimated not in the form of a single value, but in the form of a probability distribution. Furthermore, the portion above an estimated upper limit value is cut off from the probability distribution. Accordingly, the risk can be accurately calculated in accordance with the proportion of the value of the integral of the probability density function in the danger zone to the value of the integral of the probability density function in the remaining range.

In the moving object recognition system, the moving object detecting unit may include: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and the distance estimating unit may select a lowest feature point having the lowest height among the grouped feature points existing on the moving object, estimate the upper limit value of the distance from the camera to the moving object in the Z direction by calculating a Z-coordinate of a ground surface point that is an intersection point between a straight line connecting the lowest feature point to the optical center and a ground surface on which the vehicle is running, calculate, based on the vanishing point, a time to collision of the moving object with the vehicle, and determine, based on the time to collision, the probability distribution of the distance in compliance with a predetermined normal distribution.

The assumption that the distances between feature points grouped as a moving object are sufficiently smaller than the distance from the camera is valid in a moving object recognition system that recognizes moving objects existing near the vehicle. Accordingly, the upper limit of the distance to a moving object can be accurately estimated by a simple calculation in this structure. Also, the assumption that a distance probability distribution is a normal distribution is valid in a moving object recognition system that recognizes moving objects existing near the vehicle. Accordingly, the probability distribution of the distance to a moving object can be accurately determined by a simple calculation in this structure.

In the moving object recognition system, the collision risk calculating unit may divide the danger zone into a plurality of levels, and set the levels in a stepwise fashion.

With this structure, the risk can be calculated in accordance with the influence of collision with each portion of the vehicle.

According to another aspect of the present invention, a moving object recognition system includes: a camera configured to capture a plurality of continuous single-view images, the camera being installed in a vehicle; a moving object detecting unit configured to detect a moving object by extracting a plurality of feature points from the images captured by the camera, generating optical flows of the extracted feature points, grouping, among the extracted feature points, a plurality of feature points having the optical flows extended therefrom and converging at a vanishing point, and detecting the grouped feature points as the moving object; and a collision risk calculating unit configured to calculate a risk of the moving object colliding with the vehicle, and wherein the collision risk calculating unit calculates the risk in such a manner that the risk of the moving object located at a short distance from the vanishing point in the images becomes higher than the risk of the moving object at a long distance from the vanishing point in the images.

With this structure, the risk of a moving object colliding with the vehicle can also be obtained as information useful for the driver of the vehicle to drive safely. Here, the risk calculation is performed with a relatively inexpensive mechanism such as a monocular camera, instead of a relatively expensive mechanism such as a stereo camera. Accordingly, the costs can be lowered. Furthermore, the risk can be calculated by a simple calculation based on the distance between the vanishing point and the moving object in images.

In the moving object recognition system, the collision risk calculating unit may calculate a risk of a representative point with the vehicle, the representative point being one of the feature points existing on the moving object or a point determined from the feature points existing on the moving object.

With this structure, an appropriate representative point can be identified as the position of a moving object.

The moving object recognition system may further including a reporting unit configured to report a danger to a driver of the vehicle in accordance with the risk calculated by the collision risk calculating unit.

With this structure, it is possible to alert the driver in accordance with the risk of a moving object colliding with the vehicle.

In the moving object recognition system, the collision risk calculating unit may correct the risk, based on a time to collision of the moving object with the vehicle.

With this structure, the risk can be more accurately calculated by using a time to collision as well.

According to an aspect of the present invention, a storage medium has stored therein a moving object recognition program causing a computer to function as: a moving object detecting unit configured to detect a moving object from a plurality of continuous single-view images captured by a camera installed in a vehicle; a relative approach angle estimating unit configured to estimate a relative approach angle of the moving object detected by the moving object detecting unit with respect to the camera; and a collision risk calculating unit configured to calculate a risk of the moving object colliding with the vehicle, based on a relationship between the relative approach angle and a moving object direction from the camera toward the moving object.

With this structure, the risk of a moving object colliding with the vehicle can also be obtained as information useful for the driver of the vehicle to drive safely. Here, the risk calculation is performed with a relatively inexpensive mechanism such as a monocular camera, instead of a relatively expensive mechanism such as a stereo camera. Accordingly, the costs can be lowered.

According to another aspect of the present invention, a storage medium has stored therein a moving object recognition program causing a computer to function as: a moving object detecting unit configured to detect a moving object by extracting a plurality of feature points from a plurality of continuous single-view images captured by a camera installed in a vehicle, generating optical flows of the extracted feature points, grouping, among the extracted feature points, a plurality of feature points having the optical flows extended therefrom and converging at a vanishing point, and detecting the grouped feature points as the moving object; and a collision risk calculating unit configured to calculate a risk of the moving object colliding with the vehicle in such a manner that the risk of the moving object located at a short distance from the vanishing point in the images becomes higher than the risk of the moving object at a long distance from the vanishing point in the images.

With this structure, the risk of a moving object colliding with the vehicle can also be obtained as information useful for the driver of the vehicle to drive safely. Here, the risk calculation is performed with a relatively inexpensive mechanism such as a monocular camera, instead of a relatively expensive mechanism such as a stereo camera. Accordingly, the costs can be lowered. Furthermore, the risk can be calculated by a simple calculation based on the distance between the vanishing point and the moving object in images.

According to an aspect of the present invention, a moving object recognition method includes: capturing a plurality of continuous single-view images with a camera installed in a vehicle; detecting a moving object from the images captured by the camera; estimating a relative approach angle of the detected moving object with respect to the camera; and calculating a risk of the moving object colliding with the vehicle, based on a relationship between the relative approach angle and a moving object direction from the camera toward the moving object.

With this structure, the risk of a moving object colliding with the vehicle can also be obtained as information useful for the driver of the vehicle to drive safely. Here, the risk calculation is performed with a relatively inexpensive mechanism such as a monocular camera, instead of a relatively expensive mechanism such as a stereo camera. Accordingly, the costs can be lowered.

According to another aspect of the present invention, a moving object recognition method includes: capturing a plurality of continuous single-view images with a camera installed in a vehicle; detecting a moving object by extracting a plurality of feature points from the images captured by the camera, generating optical flows of the extracted feature points, grouping, among the extracted feature points, a plurality of feature points having the optical flows extended therefrom and converging at a vanishing point, and detecting the grouped feature points as the moving object; and calculating a risk of the moving object colliding with the vehicle, and wherein the risk is calculated in such a manner that the risk of the moving object located at a short distance from the vanishing point in the images becomes higher than the risk of the moving object at a long distance from the vanishing point in the images.

With this structure, the risk of a moving object colliding with the vehicle can also be obtained as information useful for the driver of the vehicle to drive safely. Here, the risk calculation is performed with a relatively inexpensive mechanism such as a monocular camera, instead of a relatively expensive mechanism such as a stereo camera. Accordingly, the costs can be lowered. Furthermore, the risk can be calculated by a simple calculation based on the distance between the vanishing point and the moving object in images.

According to the present invention, the risk of a moving object colliding with a vehicle can be calculated as information useful for the driver of the vehicle to drive safely. Also, the risk calculation can be performed with a relatively inexpensive mechanism such as a monocular camera, instead of a relative expensive mechanism such as a stereo camera. Accordingly, the costs can be lowered.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a table for explaining a risk calculation involving the TTC in the embodiment of the present invention.

DETAILED DESCRIPTION OF EMBODIMENTS

Figure 1:
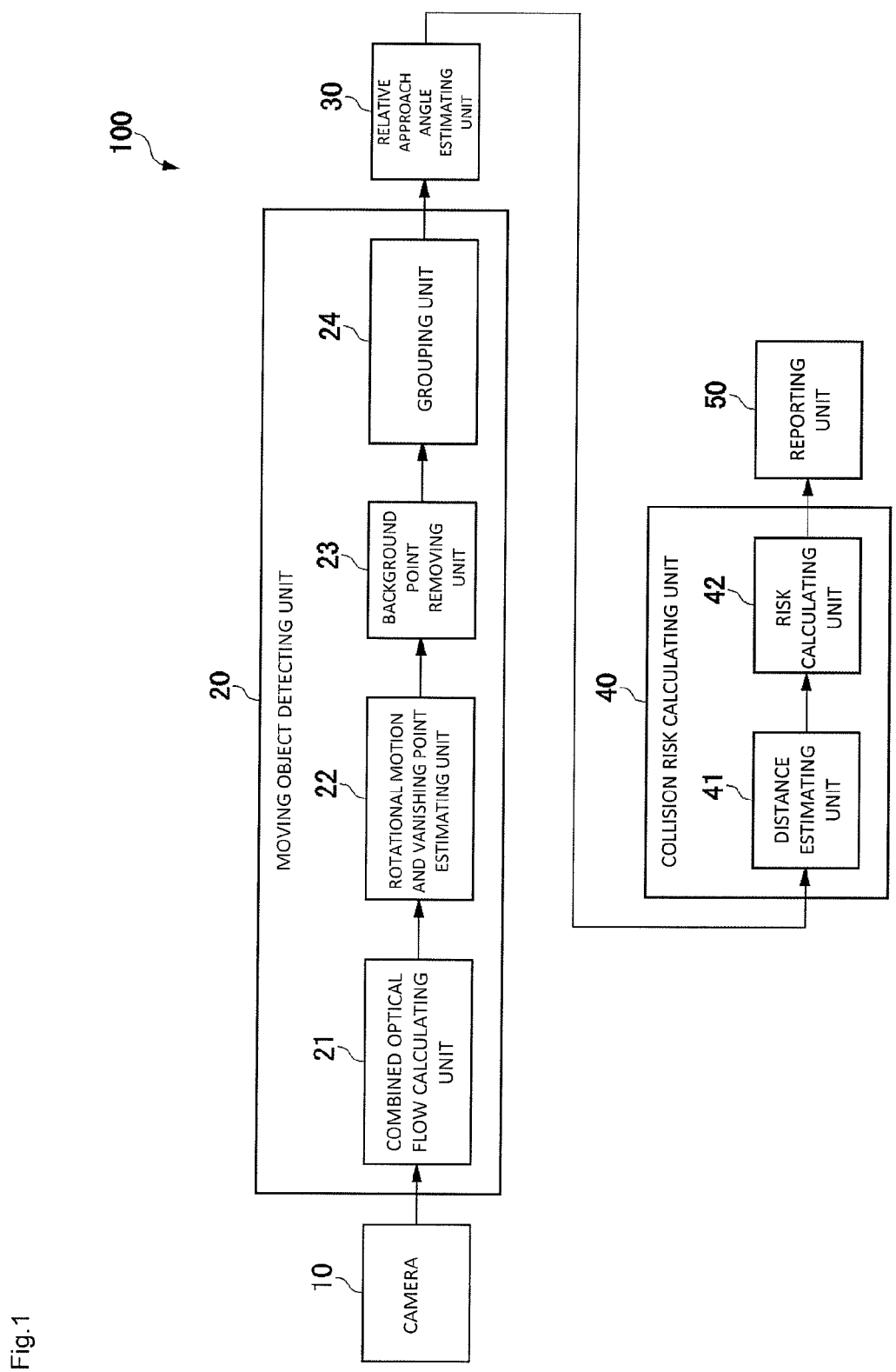
FIG. 1 is a block diagram showing the structure of a moving object recognition system according to an embodiment of the present invention.

The following is a description of a moving object recognition system according to an embodiment of the present invention, with reference to the accompanying drawings. FIG. 1 is a block diagram showing the structure of the moving object recognition system according to the embodiment of the present invention. The moving object recognition system 100 of this embodiment is a system that calculates the risk of a moving object colliding with its own vehicle, and reports the risk to the driver. The moving object recognition system 100 includes a camera 10, a moving object detecting unit 20, a relative approach angle estimating unit 30, a collision risk calculating unit 40, and a reporting unit 50. The structure formed with the moving object detecting unit 20, the relative approach angle estimating unit 30, and the collision risk calculating unit 40 is realized by a computer executing a moving object recognition program of the embodiment of the present invention. The moving object recognition program may be stored in a storage medium, be read out from the storage medium by a computer, and be executed by the computer.

First, the moving object recognition system 100 is briefly described. The camera 10 is mounted on the vehicle. While the vehicle is running, the camera 10 continuously captures images of the surroundings of the vehicle in regular cycles to generate images, and outputs the images to the moving object detecting unit 20. Using the images sequentially input from the camera 10, the moving object detecting unit 20 detects the moving object from the images. Since the vehicle (or the camera 10) is moving, the positions of the objects that are stationary on the ground vary every second in the images. From such images, the moving object detecting unit 20 detects an object that is moving relative to the ground, as a moving object.

Figure 2:
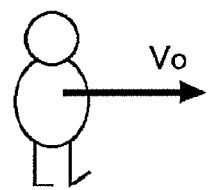
FIG. 2A is a diagram illustrating an example of a velocity relative to the ground for explaining a relative approach angle in the embodiment of the present invention.
FIG. 2B is a diagram illustrating a relative approach angle in the embodiment of the present invention.
Figure 2:
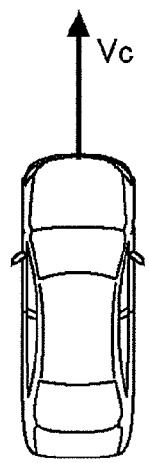
Figure 2:
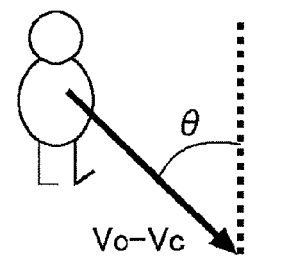
Figure 2:
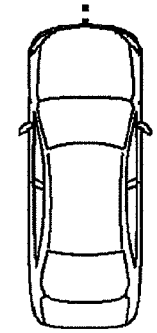

The relative approach angle estimating unit 30 estimates a relative approach angle of the relative moving direction of the detected moving object with respect to the vehicle. FIGS. 2A and 2B are diagrams for explaining a relative approach angle in the embodiment of the present invention. As shown in FIG. 2A, a vehicle C is now running forward at a velocity $v_c$, and a moving object O ahead of the vehicle C is moving at a velocity $v_o$ in a direction perpendicular to the traveling direction of the vehicle C. In this case, the relative approach angle θ is determined to be the angle of $v_o$-$v_c$ with respect to the traveling direction of the vehicle C, as shown in FIG. 2B. Using the focal lengths of the images and the camera 10, the relative approach angle estimating unit 30 estimates the relative approach angle θ.

The collision risk calculating unit 40 estimates the distance from its own vehicle to the moving object detected by the moving object detecting unit 20. Based on the estimated distance and the relative approach angle detected by the relative approach angle estimating unit 30, the collision risk calculating unit 40 calculates the risk of collision. The reporting unit 50 reports to the driver, based on the risk calculated by the collision risk calculating unit 40. The details will be described below.

The camera 10 is mounted on the vehicle, and captures images of the surroundings of the vehicle. Particularly, the moving object recognition system 100 of this embodiment calculates and reports the risk of a moving object colliding with the vehicle, and therefore, the camera 10 is installed in the vehicle so as to capture images in the traveling direction of the vehicle. The camera 10 may be installed on the back side of the room mirror (the front side), for example, so as to capture images of the scenery ahead of the vehicle. Since the vehicle can move backward, the camera 10 may be installed near the license plate at the rear end, so as to capture images of the scenery behind the vehicle. The camera 10 is a monocular camera that has only one line of an optical system and an imaging element. The camera 10 continuously captures images in regular cycles (every 1/30 second, for example), and outputs image signals.

Based on a rigid object model that linearly moves and a pinhole camera model, the moving object detecting unit 20 groups (clusters) feature points of the same moving object in accordance with information about the coordinates and motion vectors (optical flows) of the feature points in the images (for details, see JP 2011-81613 A, which is incorporated herein by reference). Here, an optical flow is a trajectory formed by tracking the same image patch (a small region of 5×5 pixels, for example) in a video or the like. The moving object detecting unit 20 also performs an operation to remove components generated by rotational motion of the camera 10 from the optical flows. The moving object detecting unit 20 includes a combined optical flow calculating unit 21, a rotational motion and vanishing point estimating unit 22, a background point removing unit 23, and a grouping unit 24.

Figure 3:
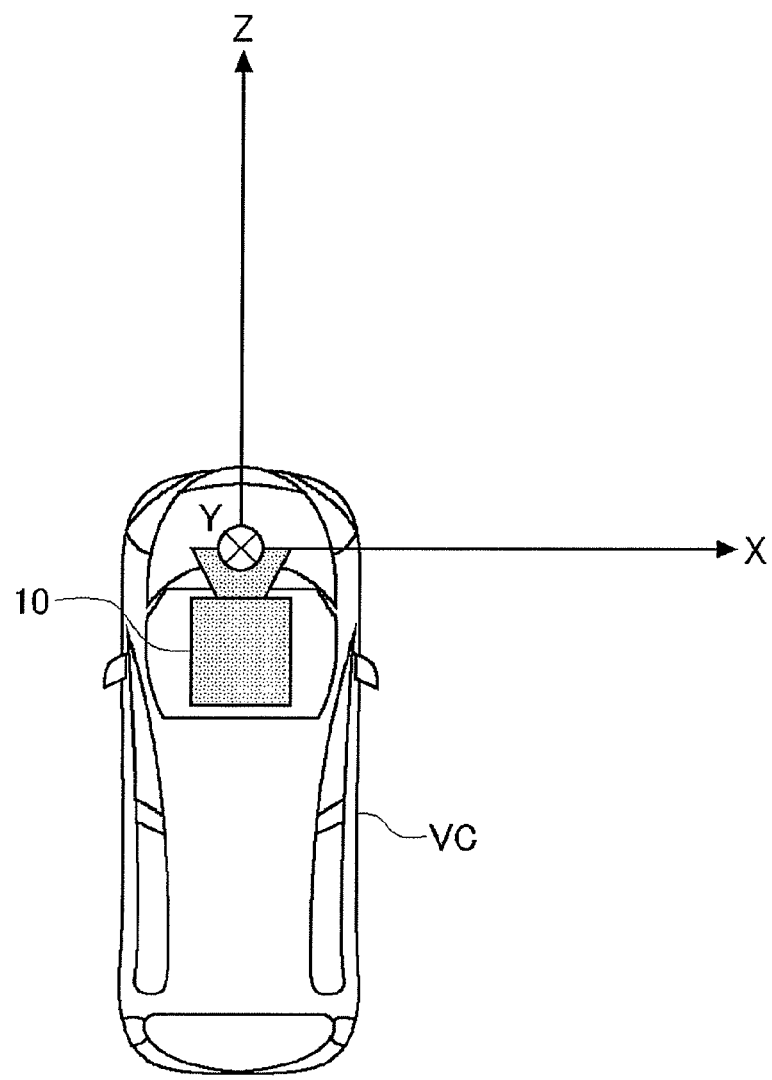
FIG. 3 is a diagram for explaining the definition of coordinates in the embodiment of the present invention.

First, the coordinates used in the following calculations are defined. FIG. 3 is a diagram for explaining the definition of the coordinates in the embodiment of the present invention. When the road surface is flat, the optical axis of the camera 10 is assumed to be parallel to the road surface. The optical axis of the camera 10 is set as the Z-axis, the vertically downward direction is the Y-axis, and the X-axis is defined by the right-handed coordinate system. The point of origin (0, 0, 0) is the optical center of the camera 10. Although the optical axis of the camera 10 is assumed to be parallel to the road surface in this embodiment, generalization can be easily performed by introducing appropriate rotation matrixes even in a case where the optical axis of the camera 10 is not parallel to the road surface. In the case of a perspectively projected model, the image coordinates (x, y) are expressed as $(x, y) = (fX/Z, fY/Z)$. Here, f represents the focal length of the camera 10, which is a known value.

The combined optical flow calculating unit 21 extracts common feature points from images obtained by the camera 10, and calculates the optical flow of each of the feature points (see J. Shi and C. Tomasi, "Good features to track", IEEE CVPR, pp. 593-600, 1994, which is incorporated herein by reference). In this embodiment, the LK method is used as the algorithm for calculating optical flows (see B. D. Lucas and T. Kanade, "An iterative image registration technique with an application to stereo vision," IJCAI, pp. 674-679, 1981, which is incorporated herein by reference).

In optical flow calculations, fewer outliers are preferable. An outlier generally means an unanticipated calculation result, and an outlier of an optical flow specifically means a trajectory that is wrongly tracked. The technique disclosed in U.S. Pat. No. 8,184,857 is robust over outliers of optical flows, but there are unusual cases where optical flows include the same vanishing point and external ratio within the margin of error, though the vanishing point and the external ratio are outliers. In such cases, the outliers are detected, resulting in a risk miscalculation. This embodiment provides an outlier removing method that requires only a small amount of calculation.

To increase the accuracy of optical flows, combined optical flows formed by combining optical flows among a few adjacent frames are used in this embodiment, instead of the optical flows between two frames adjacent to each other. In this specification, an optical flow between two frames adjacent to each other, or the vector from a feature point in a certain frame toward the same (the corresponding) feature point in the next frame, is called a "single optical flow". An optical flow obtained by connecting two or more single optical flows, or the vector from a feature point in a certain frame to the same (the corresponding feature point in a frame that is one or a predetermined number of frames away from the certain frame, is called a "combined optical flow".

Figure 4:
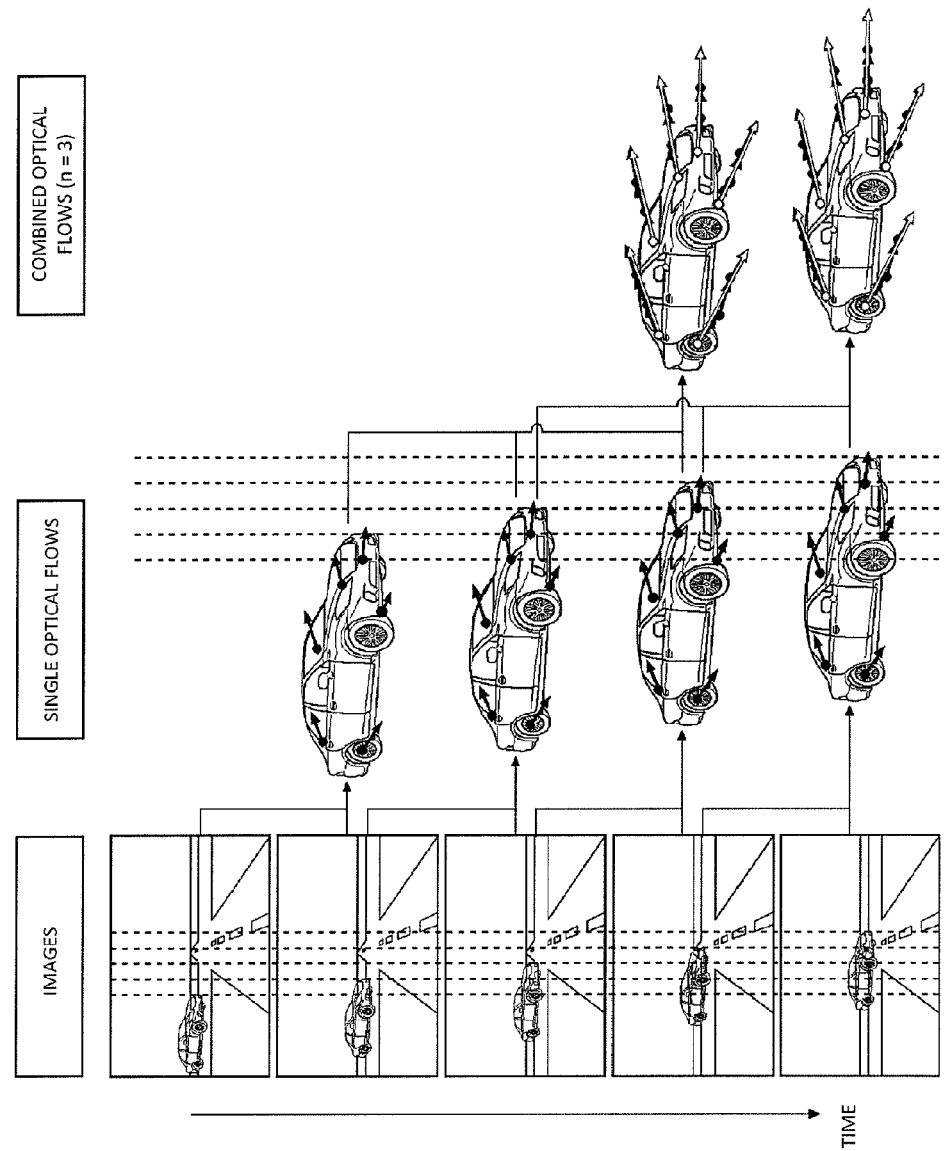
FIG. 4 is a diagram for explaining combined optical flows in the embodiment of the present invention.

FIG. 4 is a diagram for explaining a combined optical flow in the embodiment of the present invention. In FIG. 4, images continuously captured by the camera 10 are shown in chronological order from the top in the left column, single optical flows are shown in the center column, and combined optical flows each formed by combining three single optical flows are shown in the right column. The combined optical flow calculating unit 21 combines the single optical flows of the same (the corresponding) feature points among a few frames, to calculate a combined optical flow.

As shown in FIG. 4, a single optical flow is generated by connecting the same feature points between two adjacent frames, and a combined optical flow is generated by connecting single optical flows. In the example illustrated in FIG. 4, each combined optical flow is generated by combining three (n=3) optical flows.

The rotational motion and vanishing point estimating unit 22 estimates a vanishing point from combined optical flows. In general, when three-dimensional points translational-move at a constant velocity, extended lines of the trajectories of motions of the two-dimensional points formed by perspectively projecting those three-dimensional points characteristically intersect at one point. This point of intersection is the vanishing point. In this specification, the term "vanishing point" is used as the intersection point between extended lines of trajectories of points in an image plane. If there are two or more moving objects, a vanishing point is estimated for each of the moving objects.

Figure 5:
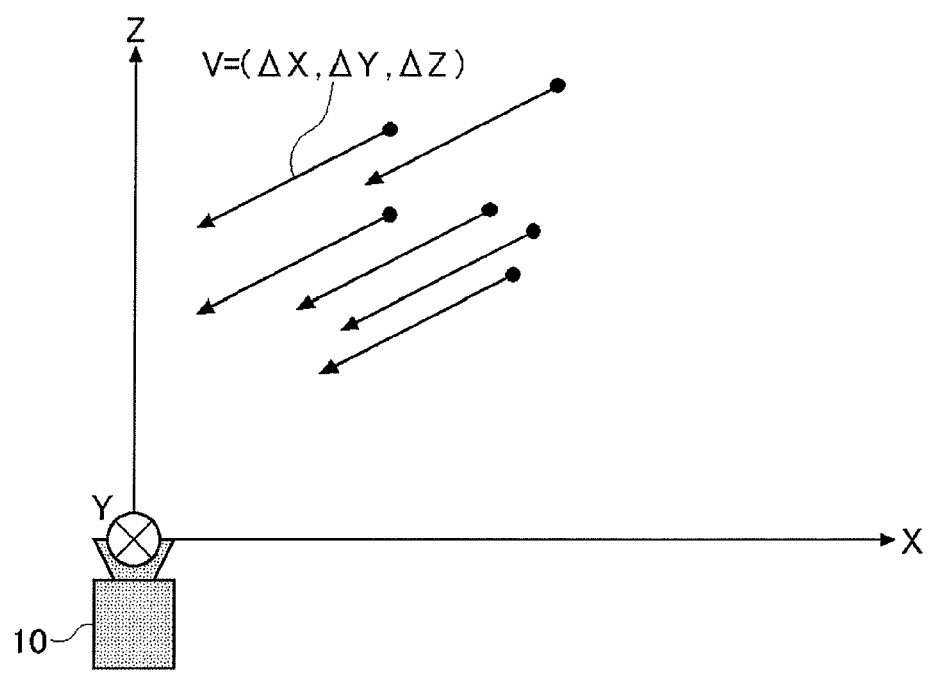
FIG. 5 is a diagram showing the distances over which points in a three-dimensional space translational-move in a unit time in the embodiment of the present invention.

FIG. 5 is a diagram showing the distances over which points in a three-dimensional space (points on a moving object) translational-move in a unit time (the velocity of the points in the three-dimensional space). Where the velocity V is ($\Delta$X, $\Delta$Y, $\Delta$Z), x(t)=f(X+t$\Delta$X)/(Z+t$\Delta$Z) and y(t)=f(Y+t$\Delta$Y)/(Z+t$\Delta$Z), which are the coordinates of an image perspectively projected at time t, converge to (f$\Delta$X/$\Delta$Z, f$\Delta$Y/$\Delta$Z) at the limit of t$\to$-$\infty$ or t$\to\infty$. Accordingly, the two-dimensional coordinates of the vanishing point are expressed as (f$\Delta$X/$\Delta$Z, f$\Delta$Y/$\Delta$Z). Points that converge at t$\to$-$\infty$ are points moving away from the camera, and points that converge at t$\to\infty$ are points moving toward the camera.

Figure 6:
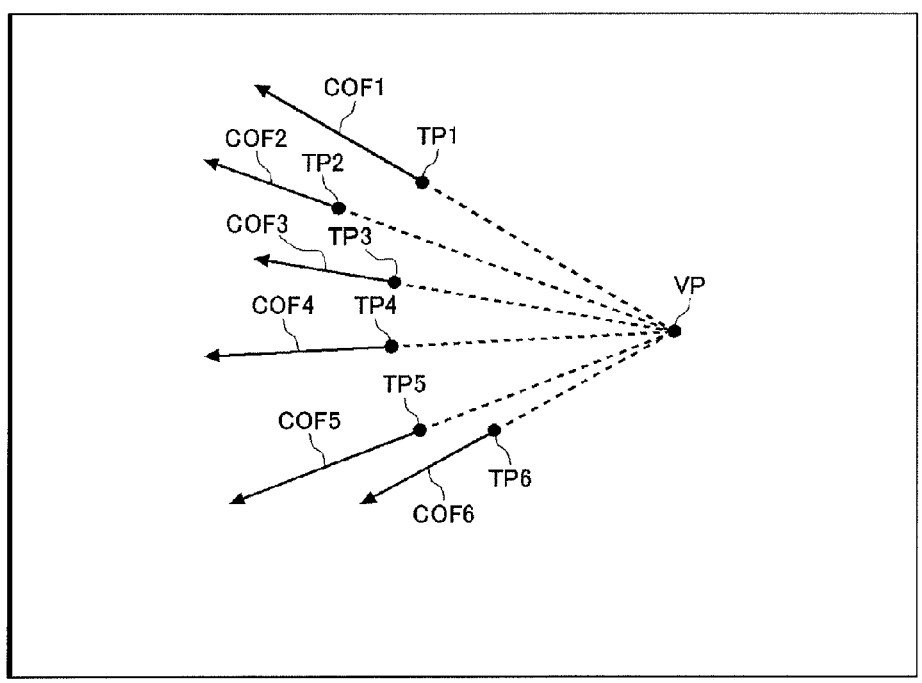
FIG. 6 is a diagram for explaining a vanishing point in the embodiment of the present invention.

FIG. 6 is a diagram for explaining the vanishing point. In the example illustrated in FIG. 6, extended lines of combined optical flows COF1 through COF6 of feature points FP1 through FP6 intersect at one point, and this point is the vanishing point VP. The rotational motion and vanishing point estimating unit 22 extends the combined optical flows of respective feature points, and detect the point at which the combined optical flows intersect. The point is estimated to be the vanishing point. Since optical flows include outliers, the optical flows of moving objects, and the optical flows of background objects, it is appropriate to use robust estimation in estimating the vanishing point. Robust estimation is parameter estimation that is robust over outliers. In this embodiment, the M-estimation (see P. J. Huber and E. M. Ronchetti, "Robust Statistics, 2nd Edition," Wiley Interscience, which is incorporated herein by reference) is used.

In a case where the above technique cannot be used due to a limited calculation capability or the like, the rotational motion and vanishing point estimating unit 22 may determine the vanishing point of combined optical flows by performing the simple operation described below. That is, the rotational motion and vanishing point estimating unit 22 records beforehand the position of the horizon in images captured by the camera 10, and the point at which the horizon and combined optical flows intersect is set as the vanishing point of the trajectory of the point. This method is based on the fact that the vanishing point of the trajectory of a moving object exists on the horizon when the moving object and the camera 10 are moving parallel to a flat ground surface. In a case where the tilt angles of combined optical flows are small (where combined optical flows are almost parallel to the horizon), however, errors in-combined optical flows greatly affect the value of the vanishing point. Therefore, if the range of the vanishing point value is too wide within the range of combined optical flow error, this point is eliminated from detection candidates in an exceptional operation.

The rotational motion and vanishing point estimating unit 22 also estimates the components of optical flows generated by rotational motion of the camera 10, and removes the components from combined optical flows. Where v=($v_x$, $v_y$) represents the optical flow of a three-dimensional point (X, Y, Z) perspectively projected by a camera that has a three-dimensional translational motion ($V_x$, $V_y$, $V_z$) and a three-dimensional rotational motion $\Omega$=($\Omega_x$, $\Omega_y$, $\Omega_z$), this optical flow v is expressed by the following equations (1):

$$\begin{cases} v_x = x\dfrac{V_z}{Z} - f\dfrac{V_x}{Z} + v_x^r(\Omega) \\ v_y = y\dfrac{V_z}{Z} - f\dfrac{V_y}{Z} + v_y^r(\Omega) \end{cases} \quad (1)$$

Here, x=fX/Z, y=fY/Z, and $v_x^r$ and $v_y^r$ are the components of the optical flow formed with the first-order term of the rotation of the camera 10. The components $v_x^r$ and $v_y^r$ are expressed by the following equations (2):

$$\begin{cases} v_x^r(\Omega) = \dfrac{xy}{f}\Omega_x - \dfrac{x^2+f^2}{f}\Omega_y + y\Omega_z \\ v_y^r(\Omega) = \dfrac{y^2+f^2}{f}\Omega_x - \dfrac{xy}{f}\Omega_y - x\Omega_z \end{cases} \quad (2)$$

According to the equations (2), $p_F$=($x_F$, $y_F$)=(f$V_x$/$V_z$, f$V_y$/$V_z$) is obtained. When the depth components Z and $V_z$ are eliminated, the following equations (3) are obtained:

$$R(p_F,\Omega)=u_x(y-y_F)-u_y(x-x_F), u_x=v_x-v_x^r, u_y=v_y-v_y^r \quad (3)$$

Here, R($p_F$, $\Omega$) is an error function in the parameter space, and is 0 in an ideal state. That is, the equations (3) mean that extended lines of the optical flows of still points minus rotational components intersect at one point in an image (or at the focus of expansion (FOE)).

Since outliers of optical flows and points on a moving object are normally considered to have large R values, the rotational motion and vanishing point estimating unit 22 in this embodiment uses the M-estimation expressed by the equation (4):

$$(p_F, \Omega) = \underset{p'_F, \Omega'}{\operatorname{argmin}} \rho(R(p'_F, \Omega')) \qquad (4)$$

Here, ρ(R) is a function that has 0 as the minimum value and is symmetrical to R=0. The degree of robustness over outliers is characterized by an influence function ψ(R)=∂ρ/∂R.

Figure 7:
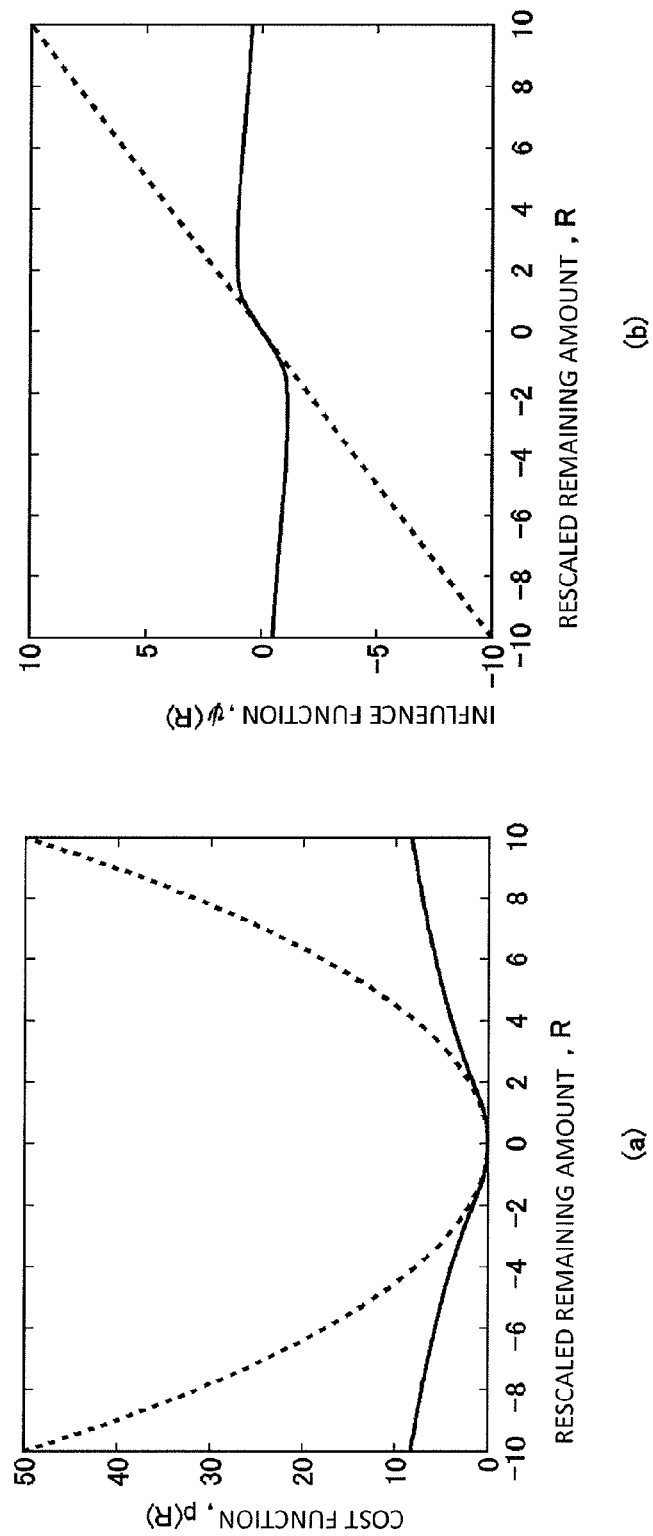
FIG. 7A is a graph showing cost functions of robust estimation in the embodiment of the present invention.
FIG. 7B is a graph showing influence functions of robust estimation in the embodiment of the present invention.

FIG. 7A is a graph showing cost functions of robust estimation, and FIG. 7B is a graph showing influence functions of robust estimation. In each of FIGS. 7A and 7B, the dashed line indicates the L2-Norm, and the solid line indicates the Cauchy function. In this embodiment, the Cauchy influence function defined by FIGS. 7A and 7B and the following equation (5) is used:

$$\psi_C(R) = \frac{R}{1 + (R/C)^2} \qquad (5)$$

The Cauchy influence function is not a monotonically increasing function where R>0, but starts decreasing at an extreme value. Accordingly, the influence on a solution of an input with a large error can be restrained to a small degree. The constant C in the equation (5) is 2.385. This value is set so as to achieve an efficiency that is 95% of the least square of a Gaussian distribution having the mean value of 0.

The rotational motion and vanishing point estimating unit 22 uses iteratively reweighted least squares (IRLS) as the method of the M-estimation. According to this method, the cost function expressed by the equation (4) is transformed into the sum of squares of a weighted error, and a least square operation and a weight updating operation are alternately performed until the solution converges. This weight is expressed as ω=ψ(R)/R according to the influence function. The IRLS algorithm is as follows:
initialize k=0; $p_F^{(0)}$, $\Omega^{(0)}$
repeat
1) k→k+1
2) calculate error R=R($p_F^{(k-1)}$, $\Omega^{(k-1)}$)
3) rescale error R→R/(1.48 mad(R))
4) update weight $\omega^{(k)}=\psi_C(R)/R$
5) ($p_F^{(k)}$, $\Omega^{(k)}$)=arg min[$\omega^{(k)}R(p'_F, \Omega')^2$]
until convergence The denominator 1.48 mad(R) in the resealing in step 3) is set so as to be equal to the standard deviation when R follows the normal distribution. The median absolute deviation (mad) is used instead of the standard deviation, to restrain the scale variation due to the existence of outliers to a small degree. Since the error is expressed in the form of the product of the FOE coordinates and the rotation motion, a non-linear least square is obtained in step 4). In this embodiment, the rotational motion and vanishing point estimating unit 22 obtains a solution by using the Newton's method. The rotational motion and vanishing point estimating unit 22 removes the detected components generated by the rotational motion from combined optical flows.

In a case where an extended straight line of a combined optical flow passes through a vanishing point in a background within an allowable range of error, the background point removing unit 23 removes the combined optical flow as an object that does not move relative to the background or to the ground surface. Since a moving object that moves relative to the ground surface has a vanishing point in a position that is not in the background, the background point removing unit 23 removes the feature points having vanishing points in the background and the combined optical flows of those feature points, so as to detect each moving object having feature points with a vanishing point not belonging to the background.

Next, the grouping unit 24 is described. Combined optical flows, which have been generated by the combined optical flow calculating unit 21, from which the components generated by rotational motion have been removed by the rotational motion and vanishing point estimating unit 22, and from which background points have been removed by the background point removing unit 23, include outliers and the optical flows of feature points on a correctly tracked moving object. Using the combined optical flows, the grouping unit 24 groups the feature points and the combined optical flows of the feature points, while removing the outliers.

The grouping unit 24 performs robust estimation of a vanishing point for the remaining feature points and the remaining combined optical flows. First, the grouping unit 24 groups, as a provisional group, the feature points and the combined optical flows having straight lines that are extended therefrom and pass through the vanishing point within an allowable range of error. The grouping unit 24 removes outliers from the provisional group, and determines an ultimate group. The grouping unit 24 first detects and removes outliers, based on the linearity of each of the combined optical flows. The grouping unit 24 further detects and removes outliers, based on TTC similarities calculated from the combined optical flows. This will be sequentially described below in detail.

(Outlier Removal Based on Linearity)

In a case where a feature point is correctly tracked, the trajectory of the feature point is a straight line, as long as the point is uniformly and linearly moving in a three-dimensional space. In general, when the position of a moving object is observed at sufficiently short time intervals, a uniform linear motion model is a suitable approximation. Therefore, determining whether single optical flows are linearly arranged is effective in removing outliers.

Figure 8:
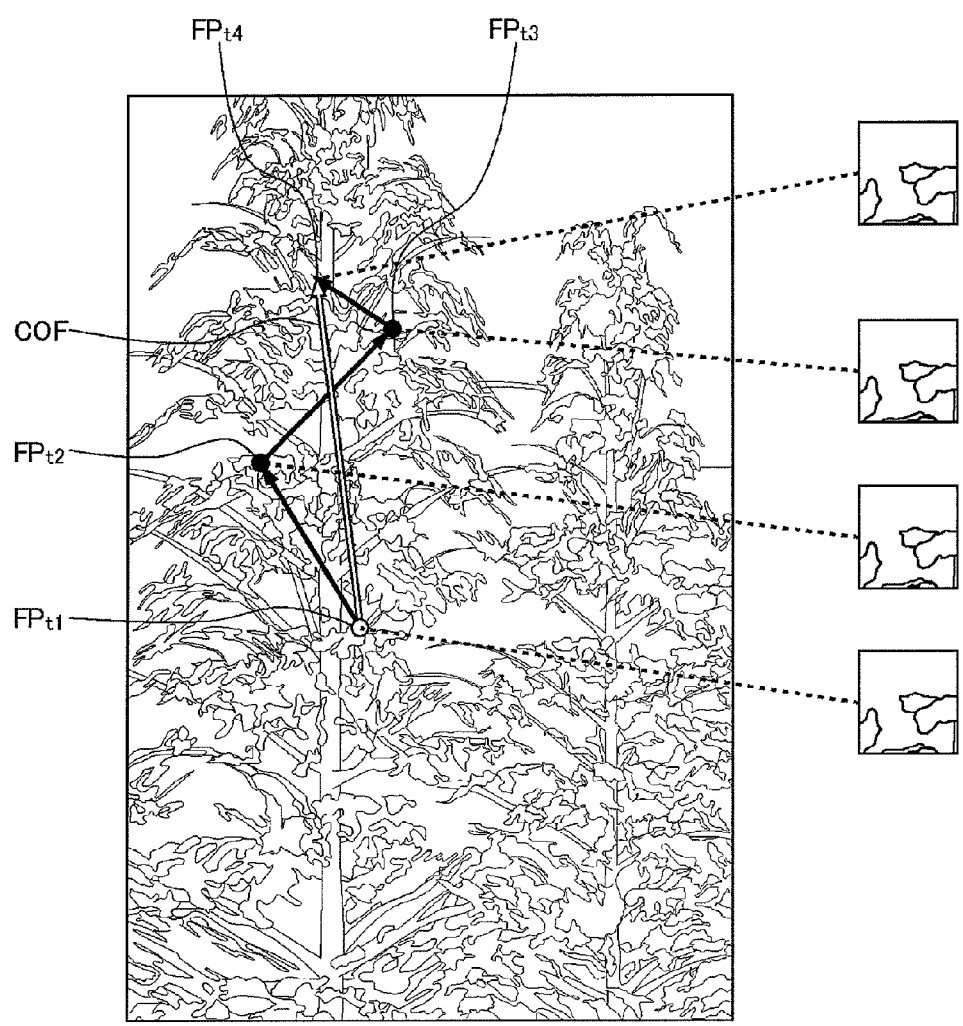
FIG. 8 is a diagram showing an example image in which outliers easily occur in the embodiment of the present invention.

FIG. 8 is a diagram showing an example image in which outliers easily occur. In a case where there are trees in an image, or where the image contains a large number of leaves and brunches having similar shapes, or where the image contains similar patterns, as shown in FIG. 8, points $FP_{t1}$, $FP_{t2}$, $FP_{t3}$, and $FP_{t4}$, which do not originally correspond to one another, are detected as corresponding feature points among frames. Such feature points and the optical flows connecting those feature points are outliers. If a combined optical flow COF of the feature points $FP_{t1}$, $FP_{t2}$, $FP_{t3}$, and $FP_{t4}$, which are detected as outliers, is determined, the difference between the combined optical flow COF and each of the single optical flow is large, as shown in FIG. 8.

To detect and remove such outliers, the grouping unit 24 extracts the components perpendicular to a combined optical flow from each of the single optical flows, quantifies the degrees of linearity based on the extracted components, and compares the values with a threshold value, to detect outliers. Specifically, the grouping unit 24 determines whether each of the single optical flows constituting combined optical flows is linear in the following manner for each feature point.

The single optical flows constituting an n-combined optical flow are represented by $(V_x(i), V_y(i))$, i=1, 2, ..., n, and the n-combined optical flow is represented by $(V_x(1:n), V_y(1:n))$. First, the grouping unit 24 calculates a unit vector perpendicular to the combined optical flow. Specifically, the unit vector is expressed as $(V_y(1:n), -V_x(1:n))/\text{sqrt}(V_x(1:n)^2+V_y(1:n)^2)$.

The absolute value of the inner product of each of the single optical flows constituting the n-combined optical flow and the unit vector is then calculated, and the sum of n absolute values is obtained. The obtained sum is set as the indicator of linearity. The grouping unit 24 compares the linearity indicator with a predetermined threshold value, and excludes the feature points having higher linearity indicators than the threshold value and the combined optical flows of those feature points from the provisional group.

(Outlier Removal Based on TTC Similarity)

Based on the combined optical flow of each feature point, the grouping unit 24 calculates the time to collision (TTC). The TTC is the time until a three-dimensional point reaches the image plane while the point is moving toward the camera. In the TTC calculation, the image plane has an infinite area. When the point is moving away from the camera, the TTC has a negative value.

Where u is a two-dimensional vector representing the combined optical flow, and $u_x$ and $u_y$ are the x component and the y component of the vector, the equation $u^2=u_x^2+u_y^2$ is satisfied, and $u_x$ is expressed by the following equation (6) using three-dimensional coordinates X and Z, and velocities $\Delta X$ and $\Delta Z$:

$$u_x = \tag{6}$$
$$x(t) - x(t - \Delta t) = f\frac{X}{Z} - f\frac{X - \Delta X}{Z - \Delta Z} = f\frac{\Delta X}{Z} - f\frac{X\Delta Z}{Z^2} + O\left(\frac{\Delta X \Delta Z}{Z^2}\right)$$

Here, f represents the focal length of the camera 10. Since the terms with the squares of velocities can be ignored, the following equation (7) is obtained:

$$u_x \approx \frac{1}{\Delta T}(x - x_\infty) \tag{7}$$

Here, the x-coordinate $x_\infty$ of the vanishing point is a convergence position when it is infinitely going back in time (where the point is moving toward the camera). Therefore, the x-coordinate $x_\infty$ of the vanishing point is expressed by the following equation (8):

$$x_\infty = \lim_{\Delta t \to \infty} f\frac{X - \Delta t \Delta X}{Z - \Delta t \Delta Z} = f\frac{\Delta X}{\Delta Z} \tag{8}$$

Where TTC is represented by $\Delta T$, $\Delta T$ is determined by $Z/(-\Delta Z)$ ($\Delta Z<0$, if the feature point is moving toward the camera). Since the y component $u_y$ of the optical flow can be calculated in the same manner, the following equation (9) is obtained:

$$u_y \approx \frac{1}{\Delta T}(y - y_\infty) \tag{9}$$

When the equation (7) and the equation (9) are simultaneously solved, the following equation (10) is obtained:

$$\Delta T = \frac{u \cdot (p - p_\infty)}{u^2} \tag{10}$$

Here, p represents the coordinates of a feature point in the image, $p_\infty$, represents the coordinates of the vanishing point of the trajectory of the point in the image, and "·" is the inner product operator.

The grouping unit 24 calculates the time to collision $\Delta T_n$ from the n-combined optical flow $(V_x(1:n), V_y(1:n))$ of each feature point, using the equation (10). The grouping unit 24 also calculates $\Delta T_{n-1}, \Delta T_{n-2}, \ldots$ of the same feature point in the same manner as $\Delta T_n$. In a case where a feature point is correctly tracked, $\Delta T_n, \Delta T_{n-1}, \ldots$ are equal to one another, as long as the point is uniformly and linearly moving in a three-dimensional space. In a case where a moving object is observed at sufficiently short time intervals, a uniform linear motion model is a suitable approximation, as described above. Therefore, it is safe to say that $\Delta T_n, \Delta T_{n-1}, \ldots$ are similar to one another. If $\Delta T_n, \Delta T_{n-1}, \ldots$ are not similar, the point has been wrongly tracked, and can be determined to be an outlier.

The grouping unit 24 determines the similarity among the times to collision $\Delta T_n, \Delta T_{n-1}, \ldots$ for each of the feature points of n-combined optical flows, and compares the similarity with a predetermined threshold value. The grouping unit 24 excludes the feature points having smaller values than the threshold value and the combined optical flows of those feature points from the provisional group. Specifically, the grouping unit 24 quantifies the differences in TTC as $D_j=|\Delta T_{n-j}-\Delta T_n|(j=1, \ldots, n-1)$. If there is at least one "j" satisfying $D_j>D_{th}$, the feature point(s) and the combined optical flow(s) of the feature point(s) are excluded from the group. Here, $D_{th}$ is the predetermined threshold value.

The grouping unit 24 groups combined optical flows by removing outliers according to the above described method based on linearity and the method based on the TTC similarity. The feature points of combined optical flows grouped together are feature points of one moving object. The grouping unit 24 detects a moving object by grouping feature points in the above manner. The grouping unit 24 may remove outliers by using only the method based on linearity or using only the method based on TTC similarity.

Figure 9:
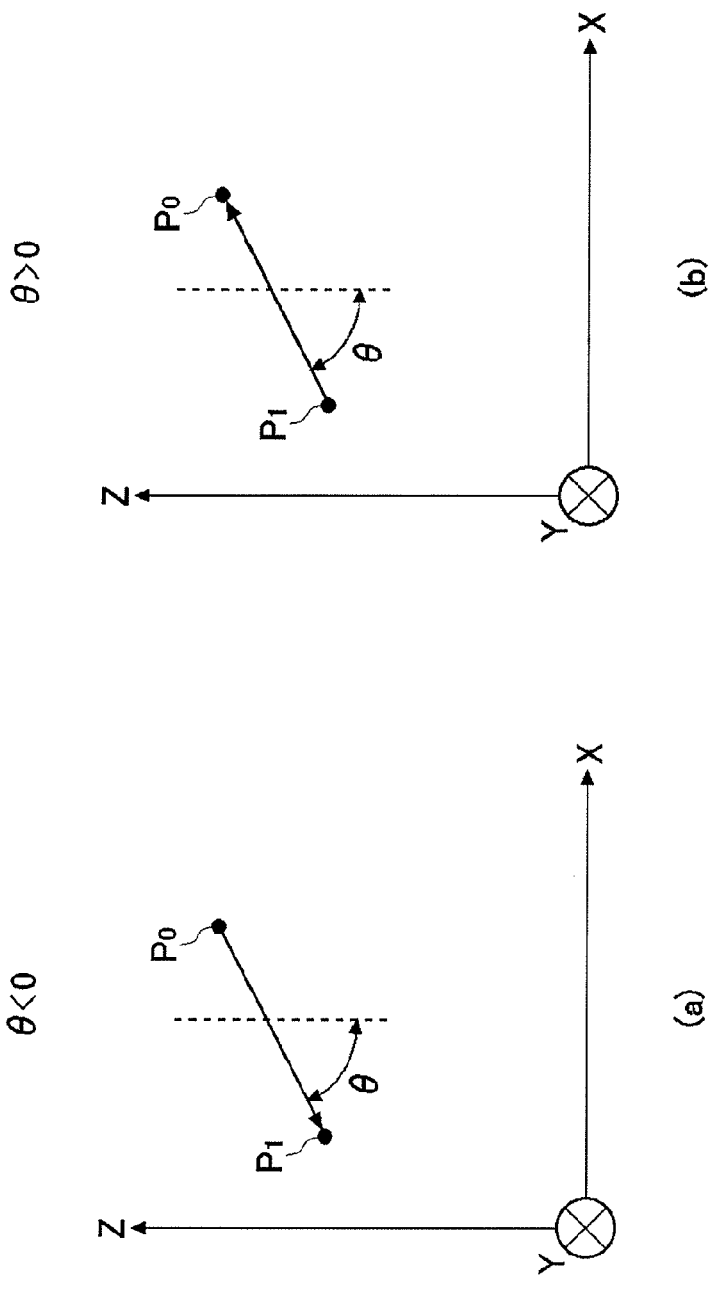
FIG. 9A is a diagram for explaining the definition of a relative approach angle (where $\theta<0$) in the embodiment of the present invention.
FIG. 9B is a diagram for explaining the definition of a relative approach angle (where $\theta>0$) in the embodiment of the present invention.

Next, the relative approach angle estimating unit 30 is described. The relative approach angle estimating unit 30 estimates the relative approach angle of a moving object detected by the moving object detecting unit 20 with respect to the vehicle. FIGS. 9A and 9B are diagrams for explaining the definition of a relative approach angle. FIG. 9A illustrates a case where $\theta<0$, and FIG. 9B illustrates a case where $\theta>0$. As shown in FIGS. 9A and 9B, when a three-dimensional point moves from $P_0$ to $P_1$, the angle expressed by the following equation (11) is defined as the relative approach angle:

$$\theta = \arctan\left(\frac{|P_0(X) - P_1(X)|}{P_0(Z) - P_1(Z)}\right) \tag{11}$$

When there are points that share the same vanishing point within an allowable range of error, the relative approach angles of those points can be estimated.

Figure 10:
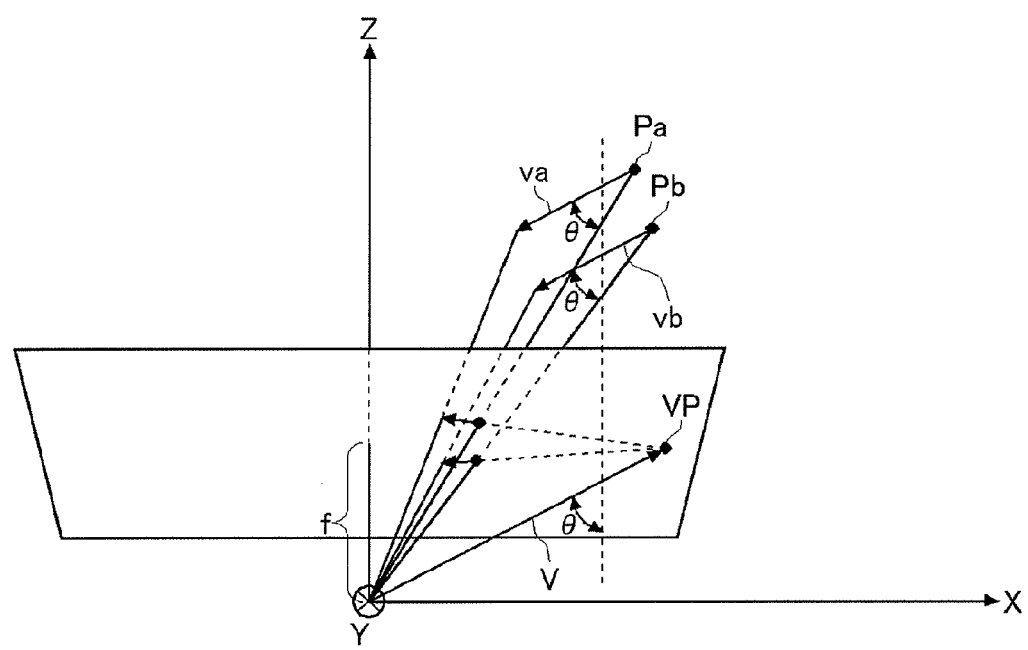
FIG. 10 is a diagram showing the relationship between a relative approach angle and a vanishing point in the embodiment of the present invention.

FIG. 10 is a diagram showing the relationship between relative approach angles and a vanishing point. When three-dimensional points Pa and Pb on a moving object are in translational motion at the same velocity, the trajectories of those points after perspective projection have a vanishing point. Where the vector V from the optical center toward the vanishing point VP is (f$\Delta X/\Delta Z$, f$\Delta Y/\Delta Z$, f), the vector V is a constant number of times (f/$\Delta Z$ times) larger than the velocity vectors of the points Pa and Pb, va=vb=($\Delta X$, $\Delta Y$, $\Delta Z$). Therefore, where an image plane perpendicular to the Z direction is set at the distance equivalent to the focal length f from the optical center in the Z direction, the vector V from the optical center toward the vanishing point VP in the image is parallel to the velocity vectors va and vb of the three-dimensional points Pa and Pb on the moving object that are in translational motion at the same velocity. In view of this, the relative approach angle is expressed by the following equation (12):

$$\theta = \arctan\left(\frac{|P_0(X) - P_1(X)|}{P_0(Z) - P_1(Z)}\right) = \arctan\left(\frac{|\Delta X|}{-\Delta Z}\right) = s * \arctan\left(\frac{|x_\infty|}{f}\right) \quad (12)$$

Here, $x_\infty$ is f$\Delta X/\Delta Z$, and s is +1 when the two-dimensional points are moving away from the vanishing point ($\Delta Z$<0), and s is −1 when the two-dimensional points are moving toward the vanishing point ($\Delta Z$>0). According to the equation (12), the relative approach angle estimating unit 30 calculates an estimated value of the relative approach angle of a moving object detected by the moving object detecting unit 20 with respect to the vehicle.

Next, the collision risk calculating unit 40 is described. The collision risk calculating unit 40 calculates the risk of a moving object colliding with its own vehicle, based on the relative approach angle, the TTC, and an estimated distance value. The collision risk calculating unit 40 includes a distance estimating unit 41 and a risk calculating unit 42. The distance estimating unit 41 estimates the Z-direction distance from its own vehicle to a moving object (hereinafter referred to simply as the "distance"). Based on the distance estimated by the distance estimating unit 41, the risk calculating unit 42 calculates the risk of the moving object colliding with its own vehicle.

The methods described below can be used by the distance estimating unit 41 to estimate the distance. The distance estimating unit 41 may estimate the distance by using one of the methods described below, or may estimate the distance by using two or more of the methods. The estimated distance is to be used by the risk calculating unit 42 to calculate a degree of risk. Therefore, the distance estimating unit 41 estimates the distance required by the method to be used by the risk calculating unit 42 to calculate a degree of risk. The following is a description of those estimation methods.

(First Example of Distance Estimation Method: Method of Calculating the Upper Limit of the Distance)

Figure 11:
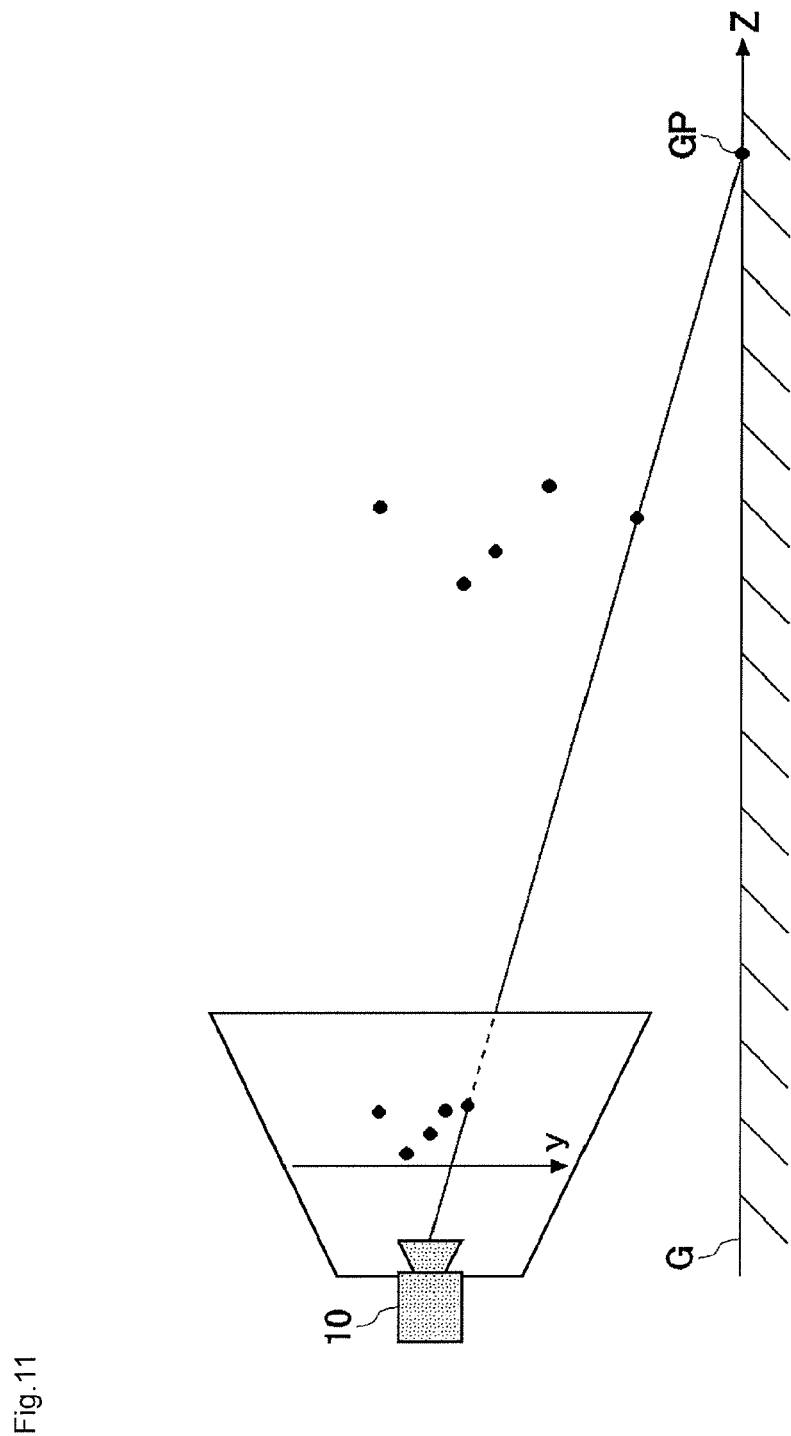
FIG. 11 is a diagram for explaining a ground surface point according to a first example of a distance estimation method in the embodiment of the present invention.
Figure 12:
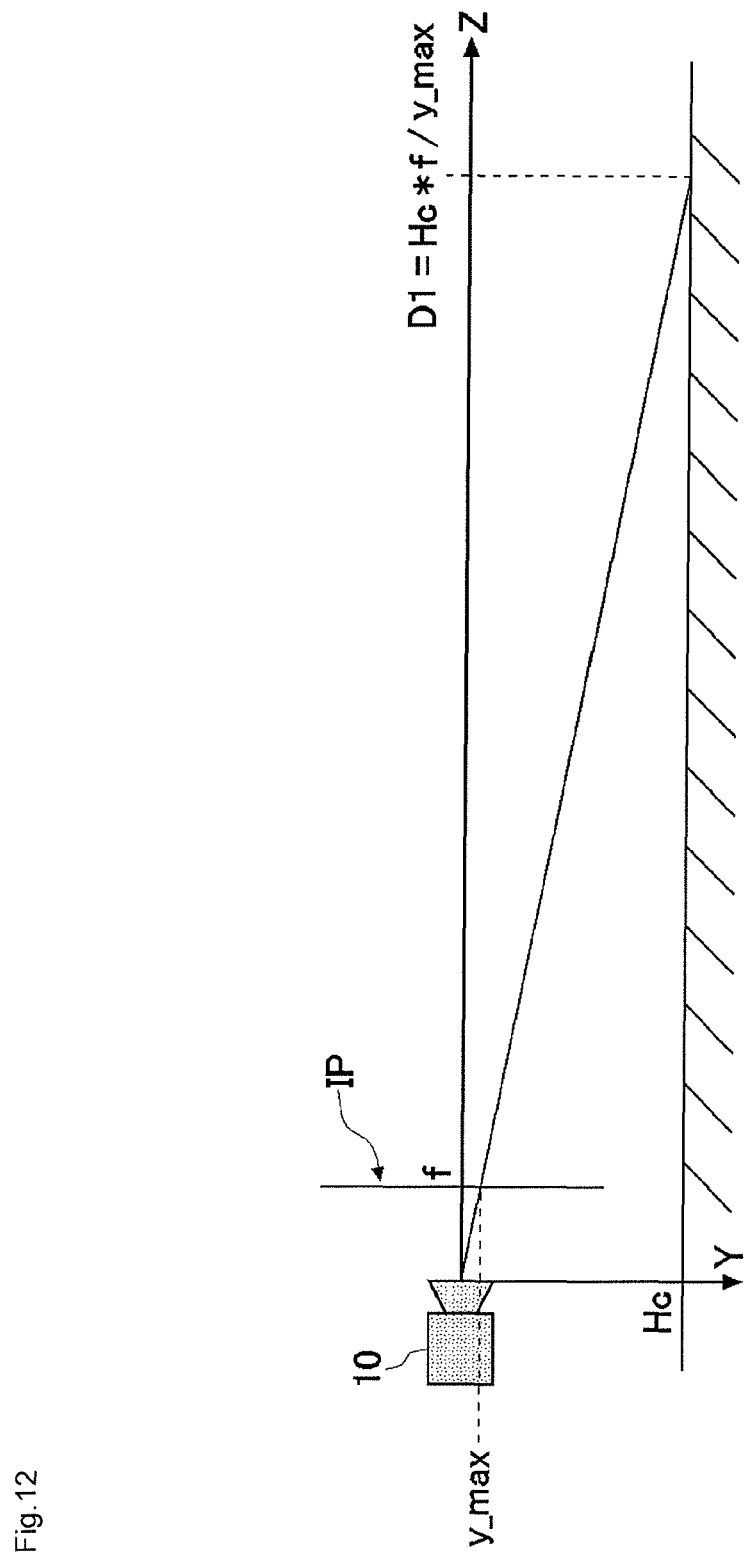
FIG. 12 is a diagram for explaining a calculation of the upper limit distance value according to the first example of a distance estimation method in the embodiment of the present invention.

In a first example, the distance estimating unit 41 estimates the upper limit of the distance to a moving object. FIG. 11 is a diagram for explaining the ground surface point according to a first example of a distance estimation method. FIG. 12 is a diagram for explaining the calculation of the upper limit value of the distance according to the first example of a distance estimation method. As shown in FIG. 11, the distance estimating unit 41 selects the feature point having the largest y-coordinate value among feature points grouped together (the selected feature point will be hereinafter referred to as the "lowest feature point"), and calculates the coordinates of the intersection point (hereinafter referred to as the "ground surface point") GP between the straight line connecting the lowest feature point to the optical center and the ground surface G As shown in FIG. 11, as long as the feature points detected as points on the moving object are located above the ground surface, the Z-coordinate of the three-dimensional point indicated by the lowest feature point is smaller than the Z-coordinate of the ground surface point GP. If the distances between feature points among the feature points grouped together are sufficiently shorter than the distance from the camera 10, the Z-coordinate of the ground surface point GP can be regarded as the upper limit value of the Z-coordinates of the feature points. The Z-coordinate of the ground surface point GP, or the upper limit value D1 of the distance, is expressed as D1=Hc*f/y_max, as shown in FIG. 12. Here, Hc represents the height of the camera 10 from the ground surface, y_max represents the y-coordinate of the lowest feature point, and f represents the focal length or the distance from the optical center of the camera 10 to the image plane IP. It should be noted that this method can be used only when y_max has a positive value. The distance estimating unit 41 calculates Hc*f/y_max as the upper limit value D1 of the distance.

(Second Example of Distance Estimation Method: Method of Directly Estimating the Distance)

In a second example, the distance estimating unit 41 identifies a point representing a moving object, and directly estimates the distance by using the translational motion velocity of its own vehicle and the time to collision TTC of the representative point. The distance estimating unit 41 selects a representative point from feature points grouped together as a moving object. The TTC of the feature point selected as the representative point has been determined by the moving object detecting unit 20, and therefore, is used herein. Where $\Delta T$ represents the TTC, the TTC is expressed as $\Delta T=Z/(-\Delta Z)$. If the moving object is translationally moving in a direction perpendicular to the traveling direction of the vehicle, $\Delta Z$ is $-V_c$. Here, $V_c$ represents the translational motion velocity of the vehicle, and the distance estimating unit 41 obtains the translational motion velocity $V_c$ through a mechanism (not shown). Based on $Z=\Delta T V_c$, the distance estimating unit 41 estimates the distance Z from its own vehicle to the moving object.

(Third Example of Distance Estimation Method: Method of Determining a Distance Probability Distribution)

In a third example, the distance estimating unit 41 identifies a point representing a moving object, and determines a distance probability distribution by using the time to collision TTC of the representative point. The distance estimating unit 41 selects a representative point from feature points grouped together as a moving object. The TTC of the feature point selected as the representative point has been determined by the moving object detecting unit 20, and therefore, is used herein. In the third example, the distance estimating unit 41 provisionally determines the probability distribution of the velocity of a moving object in the Z direction. An object that moves at a different relative approach angle from the relative approach angle of background points has an angle that is not zero with respect to the direction of translational motion of the vehicle. It is empirically appropriate to determine a normal distribution with an average of 0 to be the probability distribution of the Z-direction velocity of such a moving object.

The distance estimating unit 41 stores beforehand the average −V of the Z-direction velocity $\Delta Z$ of the representative point of a moving object, and also stores a fixed value of 3 km/h, for example, as the standard deviation $\sigma$. The probability distribution of the Z-direction velocity $\Delta Z$ of the representative point of the moving object conforms to the normal distribution with the average −V and the standard deviation σ. Where ΔT represents the TTC, the distance to the representative point is expressed as Z=ΔT(−ΔZ). Accordingly, the probability distribution of the distance Z to the representative point conforms to a normal distribution with an average ΔT(−V) and a standard deviation ΔTσ. The distance estimating unit 41 determines the normal distribution with the average ΔT(−V) and the standard deviation ΔTσ to be the probability distribution of the distance Z to the representative point.

The risk calculating unit 42 defines a danger zone based on the relative approach angle θ estimated by the relative approach angle estimating unit 30, and then calculates the risk of a moving object colliding with its own vehicle. A danger zone is a region in the X-Z plane. In such a danger zone, when a point in the X-Z plane moves toward the vehicle at a certain relative approach angle, the point collides with the vehicle. However, the region occupied by its own vehicle in the X-Z plane is a non-danger zone. The risk calculating unit 42 calculates the risk by using a method compatible with the distance estimation method used by the distance estimating unit 41. The following is a description of risk calculations.

(First Example of Risk Calculation: Risk Calculation Based on an Estimated Upper Limit Value of the Distance)

Figure 13:
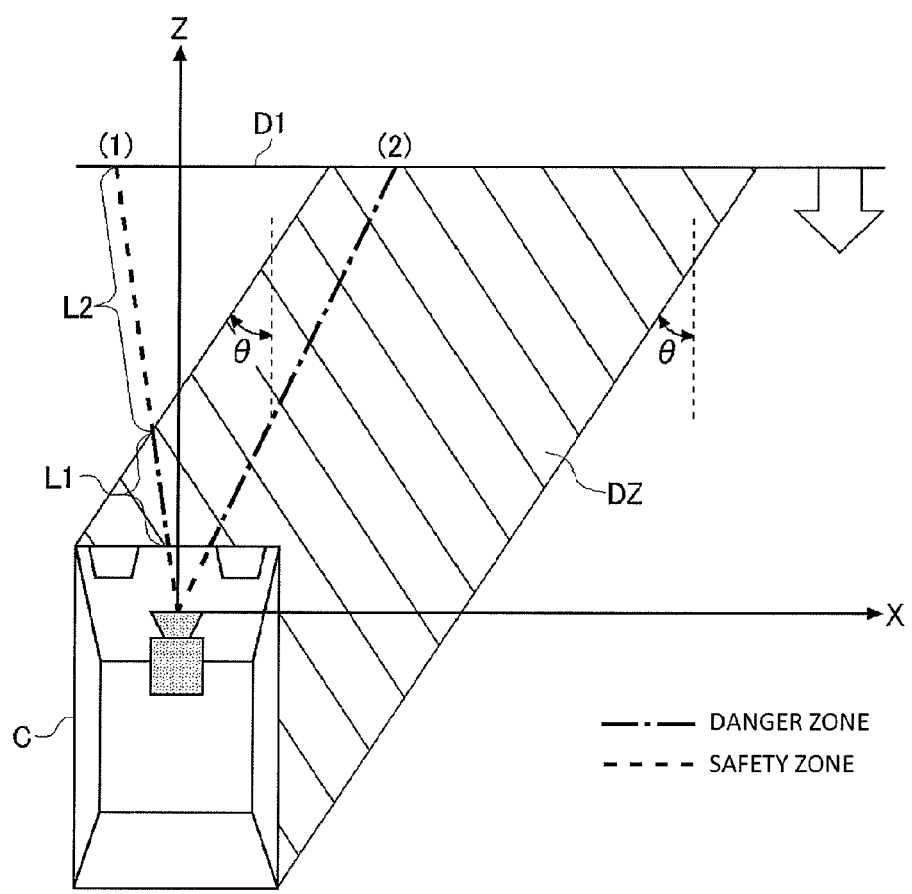
FIG. 13 is a diagram for explaining a risk calculation based on an estimated upper limit distance value in the embodiment of the present invention.

FIG. 13 is a diagram for explaining a risk calculation based on an estimated value of the upper limit of the distance. A danger zone DZ extends in a direction tilted at the relative approach angle θ with respect to the traveling direction of the vehicle C (or the Z-axis direction), and has a width equivalent to the width of the vehicle C in a direction perpendicular to the tilted direction. The danger zone DZ is closer to the vehicle C than the estimated upper limit D1 of the distance. When there is a moving object on the right side of the vehicle C, the risk calculating unit 42 sets a danger zone that is tilted at the relative approach angle θ to the right. When there is a moving object on the left side of the vehicle C, the risk calculating unit 42 sets a danger zone that is tilted at the relative approach angle θ to the left. A ray formed on the X-Z plane by orthographically projecting a straight line passing through the optical center and a point in the image is called an XZ ray. In other words, an XZ ray is a straight line that has a tilt angle expressed as X/Z=x/f, and passes through the point of origin. In FIG. 13, an XZ ray (1) and an XZ ray (2) are shown.

The risk calculating unit 42 identifies a point representing the moving object, and calculates the risk of the representative point colliding with the vehicle C by using the XZ ray of the representative point and the danger zone DZ. Specifically, the risk calculating unit 42 calculates the proportion of the line segment existing in the danger zone DZ to the line segment of the XZ ray of the representative point between the point of origin and the upper limit value D1. The value of the calculated proportion is set as the risk. In the example illustrated in FIG. 13, the risk in the XZ ray (1) is expressed as L1/(L1+L2), and the risk in the XZ ray (2) is 100% (the maximum) as the entire XZ ray (2) is in the danger zone DZ.

As is apparent from FIG. 13, in this example, the risk becomes higher, as the difference between the direction at the relative approach angle θ and the direction of the positional vector of the representative point becomes smaller (or the degree of coincidence becomes higher) in the X-Z plane. In other words, the risk becomes higher, as the vanishing point and the representative point become closer to each other in the image.

The risk calculating unit 42 may turn the proportion into a discrete value by rounding or the like, and calculates the risk as a level among several different levels. In this case, the level of risk is higher where the proportion is higher.

(Second Example of Risk Calculation: Risk Calculation Based on an Estimated Distance Value)

Figure 14:
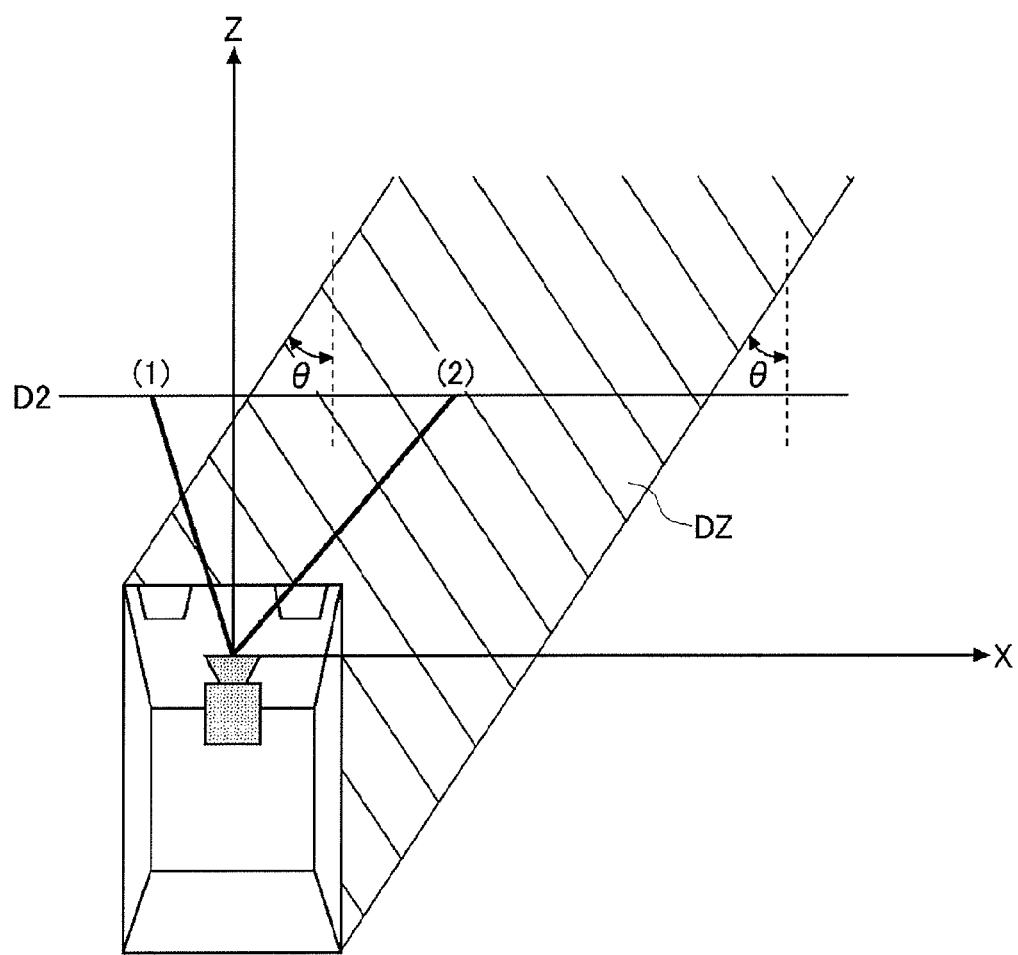
FIG. 14 is a diagram for explaining a risk calculation based on an estimated distance value in the embodiment of the present invention.

FIG. 14 is a diagram for explaining a risk calculation based on an estimated distance value. The risk calculating unit 42 sets a danger zone DZ that extends in a direction tilted at the relative approach angle θ with respect to the traveling direction of the vehicle C (or the Z-axis direction), and has a width equivalent to the width of the vehicle C in a direction perpendicular to the tilted direction, as in the above described calculation example. When there is a moving object on the right side of the vehicle C, the risk calculating unit 42 sets a danger zone that is tilted at the relative approach angle θ to the right, as in the above described example. When there is a moving object on the left side of the vehicle C, the risk calculating unit 42 sets a danger zone that is tilted at the relative approach angle θ to the left, as in the above described example. In this example, however, the upper limit of the danger zone DZ is not to be set. Since the distance D2 to the representative point is estimated in this example, the intersection point between the XZ ray of the representative point and the estimated distance value D2 is the (X, Z) coordinates of the representative point. Accordingly, the risk is determined from whether the (X, Z) coordinates of the representative point are in the danger zone DZ. That is, when the (X, Z) coordinates of the representative point are in the danger zone DZ, it is determined that there is a risk. When the (X, Z) coordinates of the representative point are not in the danger zone DZ, it is determined that there is no risk.

In FIG. 14, the intersection point between the XZ ray (1) and the estimated distance value D2 is outside the danger zone DZ. Therefore, as for the XZ ray (1), it is determined that there is no risk. The intersection point between the XZ ray (2) and the estimated distance value D2 is in the danger zone DZ. Therefore, as for the XZ ray (2), it is determined that there is a risk.

Figure 15:
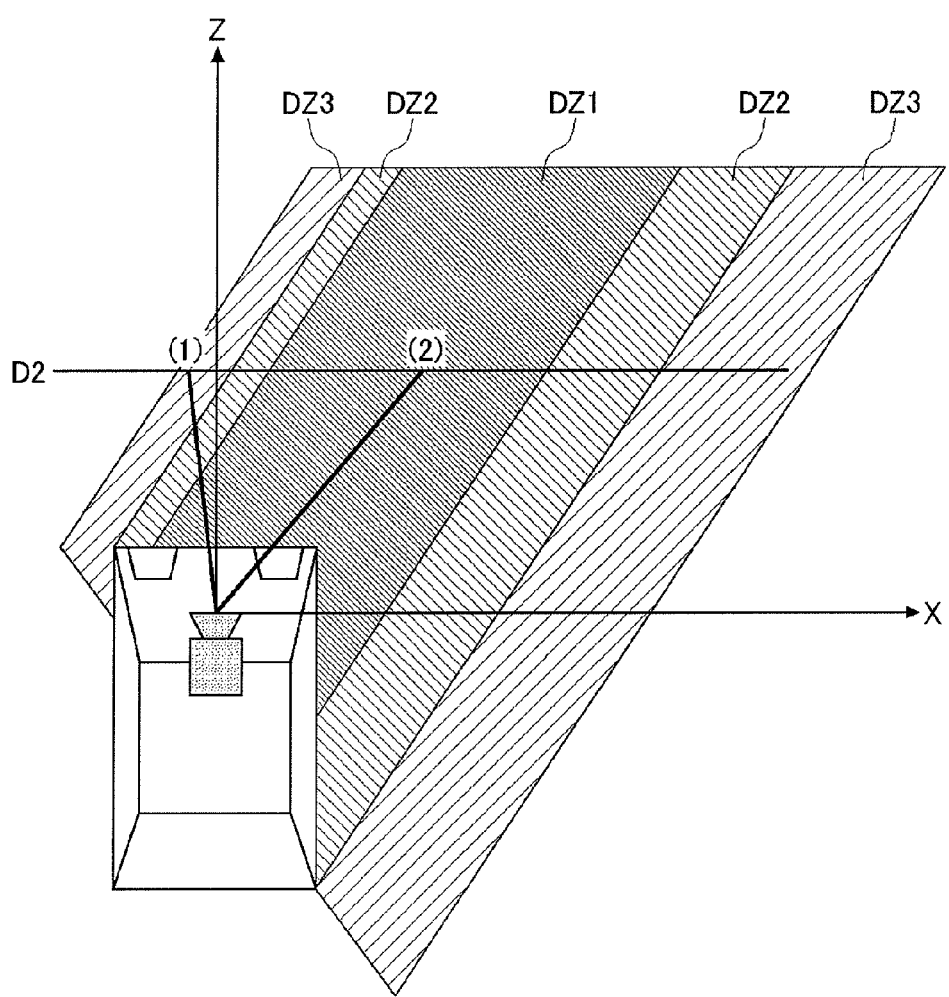
FIG. 15 is a diagram for explaining a modification of the risk calculation based on an estimated distance value in the embodiment of the present invention.

FIG. 15 is a diagram for explaining a modification of this example. In this modification, a danger zone DZ is divided into levels in a stepwise fashion, as shown in FIG. 15. In this modification, a danger zone DZ1 includes a larger proportion of the front portion (including the front bumper) of the vehicle C, and has a high risk level. A danger zone DZ2 having an intermediate risk level is set outside the danger zone DZ1. A danger zone DZ3 having a relatively low risk level is set around the danger zone DZ2. The risk calculating unit 42 determines the risk level based on which danger zone includes the intersection point between the XZ ray and the estimated distance value D2, in the same manner as above. The dividing of the danger zone into a few levels may be applied to the first example and to the third and fourth examples described later.

In this example, the risk calculation is performed so that the risk becomes higher as the difference between the direction at the relative approach angle θ and the direction of the positional vector of the representative point becomes smaller (or the degree of coincidence becomes higher) in the X-Z plane, or the risk becomes higher as the vanishing point and the representative point become closer to each other in the image, as in the above described example.

(Third Example of Risk Calculation: Risk Calculation Based on a Distance Probability Distribution)

Figure 16:
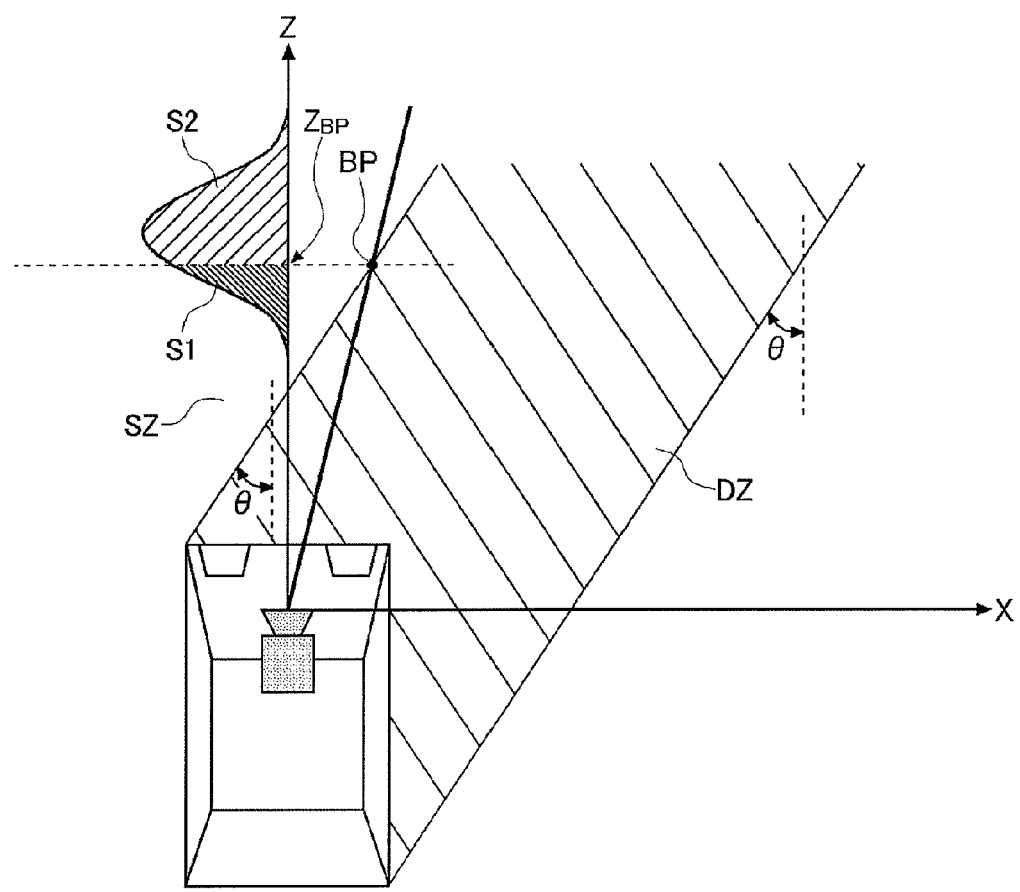
FIG. 16 is a diagram for explaining a risk calculation based on a distance probability density function in the embodiment of the present invention.

FIG. 16 is a diagram for explaining a risk calculation based on a distance probability distribution. The risk calculating unit 42 calculates a boundary point BP ($X_{BP}$, $Z_{BP}$) existing exactly on the boundary between a danger zone DZ and a safety zone SZ on the XZ ray of a representative point. The risk calculating unit 42 divides the distance probability distribution estimated by the distance estimating unit 41 into two portions, with the Z-coordinate ($Z_{BP}$) of the boundary point BP being the boundary. As a result, the value of the integral S1 of the probability density function of the probability distribution on the side of the danger zone DZ in the area of the entire probability distribution indicates the probability that the representative point is in the danger zone DZ, and the value of the integral S2 of the probability density function of the probability distribution on the side of the safety zone SZ in the area of the entire probability distribution indicates the probability that the representative point is in the safety zone SZ.

The risk calculating unit 42 determines the risk in the representative point to be the probability that the representative point is in the danger zone DZ. If the distance distribution estimated by the distance estimating unit 41 is a normal distribution, an error function can be used to obtain the integral of the distance distribution. The risk calculating unit 42 may set the probability as the risk, or determine the risk from a discrete level.

In this example, the risk calculation is performed so that the risk becomes higher as the difference between the direction at the relative approach angle θ and the direction of the positional vector of the representative point becomes smaller (or the degree of coincidence becomes higher) in the X-Z plane, or the risk becomes higher as the vanishing point and the representative point become closer to each other in the image, as in the above described examples.

(Fourth Example of Risk Calculation: Risk Calculation Based on an Estimated Upper Limit of the Distance and an Estimated Distance Distribution)

Figure 17:
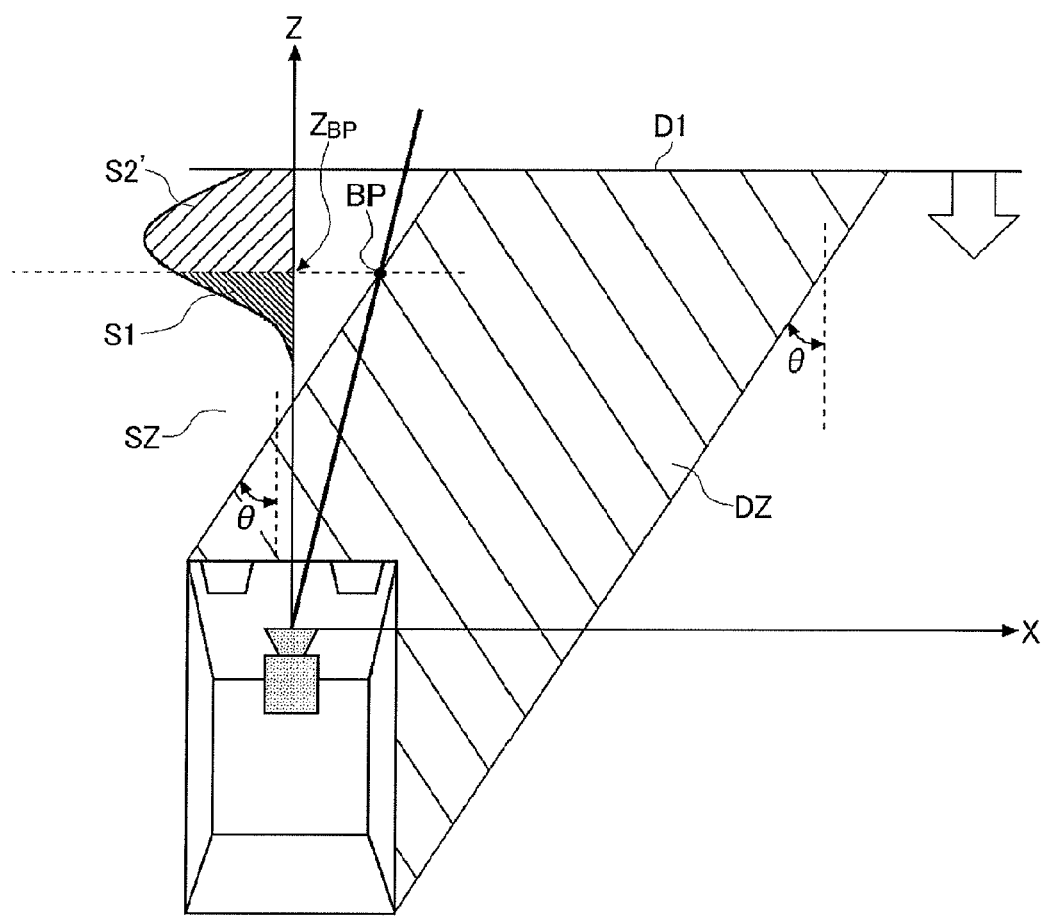
FIG. 17 is a diagram for explaining a risk calculation based on an estimated upper limit distance and an estimated distance distribution in the embodiment of the present invention.

FIG. 17 is a diagram for explaining a risk calculation based on an estimated upper limit of the distance and an estimated distance distribution. In a fourth example, the distance estimating unit 41 calculates the upper limit of the distance, and determines the distance probability distribution. The risk calculating unit 42 cuts the distance probability distribution determined by the distance estimating unit 41 at the estimated value D1 of the upper limit of the distance determined by the distance estimating unit 41, to form a single cutoff normal distribution. Using the distribution below the upper limit D1 of the distance, the risk calculating unit 42 calculates a boundary point BP ($X_{BP}$, $Z_{BP}$) existing exactly on the boundary between a danger zone DZ and a safety zone SZ on the XZ ray of the representative point in the same manner as in the third example. The risk calculating unit 42 divides the single cutoff normal distribution into two portions, with the Z-coordinate (Zap) of the boundary point BP being the boundary.

The value of the integral of the probability density function of the XZ ray of the representative point within the distance range up to the upper limit value D1 of the distance is the value of the integral of the single cutoff normal distribution, and is expressed as S1+S2', which is normally not 100%. The value of the integral of the probability density function of the XZ ray of the representative point within the distance range in the danger zone DZ is S1 shown in FIG. 17. In this example, the proportion of S1 to S1+S2' (S1/(S1+S2')) is the risk in the representative point. In this example, the risk calculating unit 42 may calculate S1/(S1+S2') as the risk, or determine the risk from a discrete level, as in the above described example.

In this example, the risk calculation is performed so that the risk becomes higher as the difference between the direction at the relative approach angle θ and the direction of the positional vector of the representative point becomes smaller (or the degree of coincidence becomes higher) in the X-Z plane, or the risk becomes higher as the vanishing point and the representative point become closer to each other in the image, as in the above described examples.

As described above, in any of the first through fourth examples of risk calculations, the risk is calculated in such a manner that the risk becomes higher as the difference between the direction at the relative approach angle θ and the direction of the positional vector of the representative point becomes smaller (or the degree of coincidence becomes higher) in the X-Z plane, or the risk becomes higher as the vanishing point and the representative point become closer to each other in the image. There can be other such examples. The collision risk calculating unit 40 may calculate the risk as the difference in angle between the direction at the relative approach angle θ and the direction of the positional vector of the representative point, or the distance between the vanishing point and the representative point in the image.

(Modification of Risk Calculation)

This modification can be applied to the above described first through fourth calculation examples. In this modification, the TTC is also used in calculating the risk in any of the above described first through fourth calculation examples. An object having a short TTC of course has a higher degree of risk than an object having a long TTC. Therefore, each risk calculated in the first through fourth calculation examples is corrected based on the length of the TTC, so that the risk becomes higher as the TTC becomes shorter.

Specifically, in a case where the risk is obtained from continuous values, the risk calculated in any of the first through fourth calculation examples is multiplied by a TTC level, which is the reciprocal of the TTC, for example. In this manner, the risk can be corrected. In a case where the risk is expressed as a discrete level, the value of the TTC is divided into three levels, as shown in FIG. 18, and the risk can be corrected by the combination of the risk level and the TTC level, for example.

As described above, the distance estimating unit 41 and/or the risk calculating unit 42 selects a representative point from feature points grouped as a moving object, and then estimates the distance and/or calculates the risk. However, the distance estimating unit 41 and/or the risk calculating unit 42 may identify two or more representative points of one moving object, estimate the distances to the respective representative points and/or calculate the risks in the respective representative points, calculate the average of the calculated risks in the representative points, and set the average as the risk of the moving object colliding with the vehicle. Also, the representative point may not be one of the feature points grouped as the moving object, but may be a point determined based on the feature points, such as the midpoint, the gravity point, or the like among the feature points.

The reporting unit 50 reports a danger to the driver in accordance with the risk of collision calculated by the collision risk calculating unit 40. The moving object recognition system 100 includes a display such as a head-up display. The image captured by the camera 10 is displayed on the display in real time. A rectangular frame surrounding the feature points grouped by the moving object detecting unit 20 is superimposed on the image. At this point, the reporting unit 50 changes the color or the thickness of the rectangular frame in accordance with the risk. Also, the reporting unit 50 may report the danger of collision to the driver with sound. In this case, as the risk becomes higher, the sound level may be increased or the frequency of the sound may be increased to alert the driver.

An automatic braking system may be used together with the reporting unit 50, or instead of the reporting unit 50. The automatic braking system receives the information about the risk calculated by the collision risk calculating unit 40, and performs braking on the vehicle. With this automatic braking system, automatic braking can be performed on the vehicle in a dangerous situation. A storage device may also be used together with the reporting unit 50, or instead of the reporting unit 50. The storage device stores the information about the risk calculated by the collision risk calculating unit 40, together with the positional information and the temporal information corresponding to the information about the risk. By referring to the record of the risk, the danger zone and time can be recognized, and the state of safe driving by the driver can be checked.

As described above, the moving object recognition system 100 of the embodiment of the present invention obtains continuous single-view images with a camera installed in the vehicle, and groups together the feature points in the images based on a vanishing point. In this manner, the moving object recognition system 100 detects a moving object. Based on the images, the moving object recognition system 100 estimates a relative approach angle, and calculates the risk of the moving object colliding with the vehicle by using the relative approach angle. The risk is an indicator with a physical meaning. As the risk is reported to the driver, the driver can instinctively recognize a dangerous situation, or can perform a control operation in accordance with the dangerous situation. Also, the moving object recognition system 100 of the embodiment of the present invention calculates the risk in such a manner that the risk becomes higher as the difference between the direction at the relative approach angle and the direction of the positional vector of the detected moving object becomes smaller. Accordingly, the risk of collision can be accurately calculated.

Furthermore, to calculate the risk of collision, neither a stereo camera nor a distance sensor is used, but a relatively inexpensive monocular camera is used. Accordingly, the costs can be lowered. The moving object recognition system 100 of the embodiment of the present invention may use a distance sensor, as well as the above described structure. In this case, the moving object recognition system 100 compares the information about a moving object trajectory obtained by the distance sensor with the information about the relative approach angle, the time to collision, the estimated distance to the moving object, and the like obtained by the above described structure. By doing so, the moving object recognition system 100 can increase the reliability of the detection. In the case where the distance sensor is also used, the distance to the moving object is also obtained by the distance sensor, and is used to improve the accuracy of calculating the risk of collision of the moving object.

Also, in detecting a moving object, combined optical flows are generated, and outliers are removed. Accordingly, the accuracy of detecting a moving object can be increased.

The present invention has an effect to calculate the risk of a moving object colliding with the vehicle, and uses the calculated risk as the information useful for the driver of the vehicle to drive safely. The present invention is effectively applied to a moving object recognition system that recognizes a moving object by using single-view images, and the likes.

While the non-limiting example embodiments have been described in detail, the foregoing description is in all aspects illustrative and not restrictive. It will be understood that numerous other modifications and variations can be devised without departing from the scope of the invention.

What is claimed is:

1. A moving object recognition system comprising:
    a camera configured to capture a plurality of continuous single-view images, the camera being installed in a vehicle;
    a moving object detecting unit configured to detect one or more moving objects from the images captured by the camera;
    a relative approach angle estimating unit configured to estimate a relative approach angle of a moving object detected by the moving object detecting unit with respect to the camera and translating with the vehicle, among the one or more moving objects, wherein the relative approach angle is an angle between a vector of translational motion of the moving object with respect to the vehicle and a vector of translational motion of a stationary object with respect to the vehicle; and
    a collision risk calculating unit configured to calculate a risk of the moving object colliding with the vehicle, based on a relationship between the relative approach angle and a moving object direction from the camera toward the moving object, wherein the collision risk calculating unit makes the risk higher as a difference between the relative approach angle and the moving object direction becomes smaller.

2. The moving object recognition system of claim 1, wherein the collision risk calculating unit sets a danger zone based on the relative approach angle, and calculates the risk based on a probability of the moving object existing in the danger zone.

3. The moving object recognition system of claim 2, wherein the danger zone is set in an X-Z plane where the camera is the point of origin, an optical axis direction of the camera is a Z direction, a vertical direction is a Y direction, and a horizontal direction is an X direction, the danger zone being a region extending from the vehicle in a direction at the relative approach angle and having a width of the vehicle.

4. The moving object recognition system of claim 3, wherein the collision risk calculating unit includes: a distance estimating unit configured to estimate an upper limit value of a distance from the camera to the moving object in the Z direction; and a risk calculating unit configured to calculate the risk by determining a proportion of a line segment existing in the danger zone to a line segment of an XZ ray between the camera and the upper limit value, the XZ ray being a line segment fanned by orthographically projecting a straight line onto the X-Z plane, the straight line passing through the camera and the moving object in the images located at a focal distance from the camera.

5. The moving object recognition system of claim 4, wherein
    the moving object detecting unit includes: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and
    the distance estimating unit selects a lowest feature point having the lowest height among the grouped feature points existing on the moving object, and estimates the upper limit value of the distance from the camera to the moving object in the Z direction by calculating a Z-coordinate of a ground surface point that is an intersection point between a straight line connecting the lowest feature point to the optical center and a ground surface on which the vehicle is running.

6. The moving object recognition system of claim 3, wherein the collision risk calculating unit includes: a distance estimating unit configured to estimate a distance from the camera to the moving object in the Z direction; and a risk calculating unit configured to make the risk higher when a point at the estimated distance from the camera on an XZ ray exists in the danger zone than when the point does not exist in the danger zone, the XZ ray being a line segment formed by orthographically projecting a straight line onto the X-Z plane, the straight line passing through the camera and the moving object in the images located at a focal distance from the camera.

7. The moving object recognition system of claim 6, wherein
the moving object detecting unit includes: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and
the distance estimating unit calculates, based on the vanishing point, a time to collision of the moving object with the vehicle, and estimates, based on the time to collision and a velocity of the vehicle, the distance from the camera to the moving object in the Z direction.

8. The moving object recognition system of claim 3, wherein the collision risk calculating unit includes: a distance estimating unit configured to determine a probability distribution of a distance from the camera to the moving object in the Z direction; and a risk calculating unit configured to calculate the risk, based on a value of the integral of a probability density function of the probability distribution within a distance range in which an XZ ray exists in the danger zone, the XZ ray being a line segment formed by orthographically projecting a straight line onto the X-Z plane, the straight line passing through the camera and the moving object in the images located at a focal distance from the camera.

9. The moving object recognition system of claim 8, wherein
the moving object detecting unit includes: an optical flow calculating unit configured to extract a plurality of feature points from the images, and calculate optical flows of the extracted feature points; and a grouping unit configured to group, among the extracted feature points, a plurality of feature points having the optical flows extended therefrom and converging at a vanishing point as a plurality of feature points existing on the moving object, and
the distance estimating unit calculates, based on the vanishing point, a time to collision of the moving object with the vehicle, and determines, based on the time to collision, the probability distribution of the distance in compliance with a predetermined normal distribution.

10. The moving object recognition system of claim 3, wherein the collision risk calculating unit includes: a distance estimating unit configured to estimate an upper limit value of a distance from the camera to the moving object in the Z direction, and determine a probability distribution of the distance from the camera to the moving object in the Z direction; and a risk calculating unit configured to calculate the risk, based on a proportion of a value of the integral of a probability density function of the probability distribution within a distance range in which an XZ ray exists in the danger zone to a value of the integral of a probability density function of the probability distribution within a distance range up to the upper limit value, the XZ ray being a line segment formed by orthographically projecting a straight line onto the X-Z plane, the straight line passing through the camera and the moving object in the images located at a focal distance from the camera.

11. The moving object recognition system of claim 10, wherein
the moving object detecting unit includes: an optical flow calculating unit configured to extract a plurality of feature points from the linages, and calculate optical flows of the extracted feature points; and a grouping unit configured to group, among the extracted feature points, a plurality of feature points having the optical flows extended therefrom and converging at a vanishing point as a plurality of feature points existing on the moving object, and
the distance estimating unit selects a lowest feature point having the lowest height among the grouped feature points existing on the moving object, estimates the upper limit value of the distance from the camera to the moving object in the Z direction by calculating a Z-coordinate of a ground surface point that is an intersection point between a straight line connecting the lowest feature point to the optical center and a ground surface on which the vehicle is running, calculates, based on the vanishing point, a time to collision of the moving object with the vehicle, and determines, based on the time to collision, the probability distribution of the distance in compliance with a predetermined normal distribution.

12. The moving object recognition system of claim 2, wherein the collision risk calculating unit divides the danger zone into a plurality of levels, and sets the levels in a stepwise fashion.

13. The moving object recognition system of claim 1, further comprising a reporting unit configured to report a danger to a driver of the vehicle in accordance with the risk calculated by the collision risk calculating unit.

14. The moving object recognition system of claim 1, wherein the collision risk calculating unit corrects the risk, based on a time to collision of the moving object with the vehicle.

15. A moving object recognition system comprising:
a camera configured to capture a plurality of continuous single-view images, the camera being installed in a vehicle;
a moving object detecting unit configured to detect one or more moving objects by extracting a plurality of feature points from the images captured by the camera, generating optical flows of the extracted feature points, grouping, among the extracted feature points, a plurality of feature points having the optical flows extended therefrom and converging at a vanishing point, and detecting the grouped feature points as the moving object; and
a collision risk calculating unit configured to calculate a risk of a moving object detected by the moving object detecting unit, translating with the vehicle and colliding with the vehicle, among the one or more moving objects, wherein the collision risk calculating unit calculates the risk of the moving object in such a manner that the risk of the moving object located at a short distance from the vanishing point in the images becomes higher than the risk of the moving object at a long distance from the vanishing point in the images, and wherein the collision risk calculating unit makes the risk higher as a difference between a relative approach angle and a moving object direction becomes smaller, the relative approach angle being an angle between a vector of translational motion of the moving object with respect to the vehicle and a vector of translational motion of a stationary object with respect to the vehicle.

16. The moving object recognition system of claim 15, wherein the collision risk calculating unit calculates a risk of a representative point with the vehicle, the representative point being one of the feature points existing on the moving object or a point determined from the feature points existing on the moving object.

17. A non-transitory computer-readable medium having stored therein a moving object recognition program causing a computer to function as:
   a moving object detecting unit configured to detect one or more moving objects from a plurality of continuous single-view images captured by a camera installed in a vehicle;
   a relative approach angle estimating unit configured to estimate a relative approach angle of a moving object detected by the moving object detecting unit with respect to the camera and translating with the vehicle, among the one or more moving objects, wherein the relative approach angle is an angle between a vector of translational motion of the moving object with respect to the vehicle and a vector of translational motion of a stationary object with respect to the vehicle; and
   a collision risk calculating unit configured to calculate a risk of the moving object colliding with the vehicle, based on a relationship between the relative approach angle and a moving object direction from the camera toward the moving object, wherein the collision risk calculating unit makes the risk higher as a difference between the relative approach angle and the moving object direction becomes smaller.

18. A non-transitory computer-readable medium having stored therein a moving object recognition program causing a computer to function as:
   a moving object detecting unit configured to detect one or more moving objects by extracting a plurality of feature points from a plurality of continuous single-view images captured by a camera installed in a vehicle, generating optical flows of the extracted feature points, grouping, among the extracted feature points, a plurality of feature points having the optical flows extended therefrom and converging at a vanishing point, and detecting the grouped feature points as the moving object; and
   a collision risk calculating unit configured to calculate a risk of a moving object detected by the moving object detecting unit, translating with the vehicle and colliding with the vehicle, among the one or more moving objects, in such a manner that the risk of the moving object located at a short distance from the vanishing point in the images becomes higher than the risk of the moving object at a long distance from the vanishing point in the images,
   wherein the collision risk calculating unit makes the risk higher as a difference between a relative approach angle and a moving object direction becomes smaller, the relative approach angle being an angle between a vector of translational motion of the moving object with respect to the vehicle and a vector of translational motion of a stationary object with respect to the vehicle.

19. A moving object recognition method comprising:
   capturing a plurality of continuous single-view images with a camera installed in a vehicle;
   detecting one or more moving objects from the images captured by the camera;
   estimating a relative approach angle of a moving object detected in the detecting step with respect to the camera and translating with the vehicle, among the one or more moving objects, wherein the relative approach angle is an angle between a vector of translational motion of the moving object with respect to the vehicle and a vector of translational motion of a stationary object with respect to the vehicle; and
   calculating a risk of the moving object colliding with the vehicle based on a relationship between the relative approach angle and a moving object direction from the camera toward the moving object, wherein the collision risk calculating step makes the risk higher as a difference between the relative approach angle and the moving object direction becomes smaller.

20. A moving object recognition method comprising:
   capturing a plurality of continuous single-view images with a camera installed in a vehicle;
   detecting one or more moving objects by extracting a plurality of feature points from the images captured by the camera, generating optical flows of the extracted feature points, grouping, among the extracted feature points, a plurality of feature points having the optical flows extended therefrom and converging at a vanishing point, and detecting the grouped feature points as the moving object; and
   calculating a risk of a moving object detected in the detecting step, translating with the vehicle and colliding with the vehicle, among the one or more moving objects, and
   wherein the risk is calculated in such a manner that the risk of the moving object located at a short distance from the vanishing point in the images becomes higher than the risk of the moving object at a long distance from the vanishing point in the images, and
   wherein the collision risk calculating step makes the risk higher as a difference between a relative approach angle and a moving object direction becomes smaller, the relative approach angle being an angle between a vector of translational motion of the moving object with respect to the vehicle and a vector of translational motion of a stationary object with respect to the vehicle.

* * * * *